United States Patent
Iwatsuki et al.

(10) Patent No.: US 7,046,624 B1
(45) Date of Patent: May 16, 2006

(54) NETWORK APPARATUS AND A METHOD FOR COMMUNICATING BY USING THE NETWORK APPARATUS

(75) Inventors: Kazuko Iwatsuki, Kawasaki (JP); Tatsuya Watanuki, Ebina (JP); Takahisa Miyamoto, Ebina (JP); Toshikazu Yasue, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 09/660,362

(22) Filed: Sep. 12, 2000

(30) Foreign Application Priority Data

Sep. 16, 1999 (JP) ................................. 11-261558

(51) Int. Cl.
*H04J 3/02* (2006.01)

(52) U.S. Cl. ..................................... 370/229; 370/447
(58) Field of Classification Search ................ 370/446, 370/445, 229, 231, 447, 236, 230
See application file for complete search history.

(56) References Cited

U.S. PATENT DOCUMENTS

| | | | |
|---|---|---|---|
| 6,026,075 A * | 2/2000 | Linville et al. | 370/236 |
| 6,170,022 B1 * | 1/2001 | Linville et al. | 370/231 |
| 6,628,613 B1 * | 9/2003 | Joung et al. | 370/230 |
| 6,724,725 B1 * | 4/2004 | Dreyer et al. | 370/231 |

OTHER PUBLICATIONS

IEEE P802.3x, Specification for 802.3 Full-Duplex Operation, Revision 3.2, Feb, 9, 1997.

\* cited by examiner

*Primary Examiner*—Ricky Ngo
*Assistant Examiner*—Richard Chang
(74) *Attorney, Agent, or Firm*—Mattingly, Stanger, Malur & Brundidge, P.C.

(57) ABSTRACT

A network apparatus according to the present invention is connected to a single server apparatus or a plurality of server apparatus via a link. The network administrator sets in advance the band volume to be used by a frame transmitted from each of the server apparatus within the range of the communication band volume possessed by the link. The network apparatus has a band controller that instructs each of the server apparatus to transmit a PAUSE frame. The network apparatus is also provided with a transmitter that transmits a PAUSE frame to each of the server apparatus via the link according to the instruction of the band controller. Each of the server apparatus receives the PAUSE frame transmitted from the network apparatus. Each of the server apparatus suspends frame transmission to the network apparatus for the suspension period set in the received PAUSE frame.

20 Claims, 12 Drawing Sheets

NETWORK APPARATUS AND A METHOD FOR COMMUNICATING BY USING THE NETWORK APPARATUS

BACKGROUND OF THE INVENTION

The present invention relates to a network apparatus that forms a server-client system, and particularly to an apparatus and a method for controlling the band of communication (volume of traffic) from a server to a client, the apparatus being placed between a server farm comprising a single server or a plurality of servers and a LAN that bundles client apparatus.

In IEEE802.3, there are specifications provided for the local area network (LAN). Many network systems are formed by the LAN specified in IEEE802.3.

In recent years, the apparatus that forms such a network system has changed in its main element from the hub apparatus used to construct a shared bus network to the LAN switch used to construct a switching network. As the network apparatus has changed, links which connect the network interfaces of the apparatus forming a network system have also changed. More specifically, half duplex links used in the conventional shared bus have been replaced with full duplex links. The full duplex link allows the apparatus connected to the link to transmit and receive data to and from each other simultaneously. The apparatus that forms a network system is, for example, a network apparatus such as a LAN switch, a host apparatus such as a server/PC, or the like.

The full duplex link is provided with different communication lines each for transmission and for reception. In the full duplex link, collision between transmission data and reception data is not caused, and therefore the apparatus on the transmitting side is able to transmit frames continuously. However, if the transmission traffic of the frames exceeds the capacity of the apparatus on the receiving side to process received data, the apparatus on the receiving side abandons frames. As a means to avoid the abandoning of frames, there are provided specifications called IEEE802.3x. IEEE802.3x relates to a technology that temporarily stops the transmission traffic between the apparatus connected to each other by a full duplex link.

IEEE802.3x specifies a case where of the two apparatuses connected to each other by a full duplex link, one apparatus needs to stop frame transmission from the other apparatus for a certain period of time. In this case, the apparatus on the receiving side transmits a control frame called "PAUSE" to the other apparatus. After receiving the PAUSE frame, the other apparatus will stop frame transmission for a period of time specified by the PAUSE frame.

Specific details regarding the PAUSE frame will be explained with reference to FIG. 15.

As shown in FIG. 15, a network apparatus 151 and a server apparatus 3 connected to each other by a full duplex link 2 are provided with MAC (Media Access Control) chip sets 4 and 5, and MAC control units 6 and 7, respectively. If the MAC chip sets 4 and 5 and the MAC control units 6 and 7 are provided with the PAUSE function specified in IEEE802.3x, they operate as follows.

The MAC control units 6 and 7 receive instructions for the transmission of a PAUSE frame including information on PAUSE time from host programs or the like. The MAC chip sets 4 and 5 create a PAUSE frame in which the specified PAUSE time is set, according to the transmission instructions. The MAC chip sets 4 and 5 transmit the PAUSE frame after it is created. In addition, the MAC chip sets 4 and 5 receives a PAUSE frame from the apparatus to which the MAC chip sets 4 and 5 are connected through the link 2. The MAC control units 6 and 7 decodes the content of the received PAUSE frame. After decoding the content of the received PAUSE frame, the MAC control units 6 and 7 set the specified PAUSE time in built-in PAUSE timers 8 and 9. After setting the PAUSE time, the MAC control units 6 and 7 wait until the frame transmission being performed at the time when the PAUSE time was set is completed. The MAC control units 6 and 7 starts the PAUSE timers 8 and 9 after the frame transmission is completed. As a result, frame transmission is suspended for a period of time until the PAUSE time passes.

The PAUSE time is specified in a range of 1 to 65535. The unit of one PAUSE time period represents the time required for the transmission of one 64-byte frame. This represents the time spent in the transmission of 512 bits (512-bit time).

In the meantime, the configuration of the intranet has changed in recent years. As the configuration of the intranet has changed, the rate of communication traffic between an enterprise server group (server farm) at the center of the organization and clients at each division has increased. In addition, there have appeared the high-speed LAN as specified in IEEE802.3z as well as the link aggregation technology (specified in IEEE802.3ad), a high-speed connection system between apparatus. The advent of such a system and technology has created a tendency for transmission traffic from the server apparatus to be increased. Incidentally, traffic means communication band volume, and transmission traffic means transmission band volume per unit of time.

Generally, in a server-client system, the band of a LAN where end clients are connected is small. Therefore, if transmission traffic from the server apparatus is heavy, congestion occurs at an intermediate network apparatus. The network apparatus abandons frames as congestion occurs.

SUMMARY OF THE INVENTION

Usually, the apparatus that form a communication network system abandon frames when they receive the traffic that exceeds their processing capacities. The abandoned frames are retransmitted from the apparatus on the transmitting side, and therefore the transmission traffic is further increased. As a result, there is caused a vicious circle of more frames abandoned by the apparatus on the receiving side.

Thus, controlling traffic by abandoning frames cannot solve the problem of congestion. The transmission source of high traffic is the server farm. Therefore, a means to control transmission traffic is required of the server apparatus itself.

In addition, the network administrator performs the band control of server traffic on an application-by-application basis. The network administrator requires a means to provide a communication band that satisfies the needs of network users while making it possible to avoid congestion.

As described above, the IEEE802.3x specification is proposed for the purpose of suspending transmission traffic from one of the two apparatus. In the IEEE802.3x specification, there is not specified a means whereby at least one of the two apparatus transmits a PAUSE frame and thereby controls the communication band volume from the other apparatus. Therefore, a new means will be required to solve the problems mentioned above.

The present invention relates to a technology for avoiding congestion in a network system that forms a server-client system. According to the present invention, server traffic is controlled according to the unit (application, destination IP address, or the like) set by the network administrator. According to the present invention, communication band volume is controlled without causing unnecessary transmission delay.

A network apparatus is connected to a single server apparatus or a plurality of server apparatus via a link. The network administrator sets in advance the band volume to be used by a frame transmitted from each of the server apparatus within the range of the communication band volume possessed by the link. The network apparatus has a band controller that instructs each of the server apparatus to transmit a PAUSE frame. The network apparatus is also provided with a transmitter that transmits a PAUSE frame to each of the server apparatus via the link according to the instruction of the band controller. A suspension period for which each of the server apparatus suspends frame transmission is set in the PAUSE frame. Each of the server apparatus receives the PAUSE frame transmitted from the network apparatus. Each of the server apparatus suspends frame transmission to the network apparatus for the suspension period set in the received PAUSE frame. After the suspension period has passed, the server apparatus start frame transmission to the network apparatus.

The band controller provides an instruction for PAUSE frame transmission periodically, or provides an instruction for PAUSE frame transmission when the transmission band volume of the frame transmitted from one of the server apparatus exceeds a preset band volume to be used.

The transmission traffic from each of the server apparatus is controlled to within a preset communication band volume by causing each of the server apparatus to suspend frame transmission.

DESCRIPTION OF THE PREFERRED EMBODIMENTS

Embodiments of the present invention will be described as follows with reference to FIG. 1.

Incidentally, one unit of time described in the present embodiment is the time spent in the transmission of 512 bits (512-bit time) unless otherwise specified. This is the time unit specified in IEEE802.3x (512-bit time).

Figure 1:
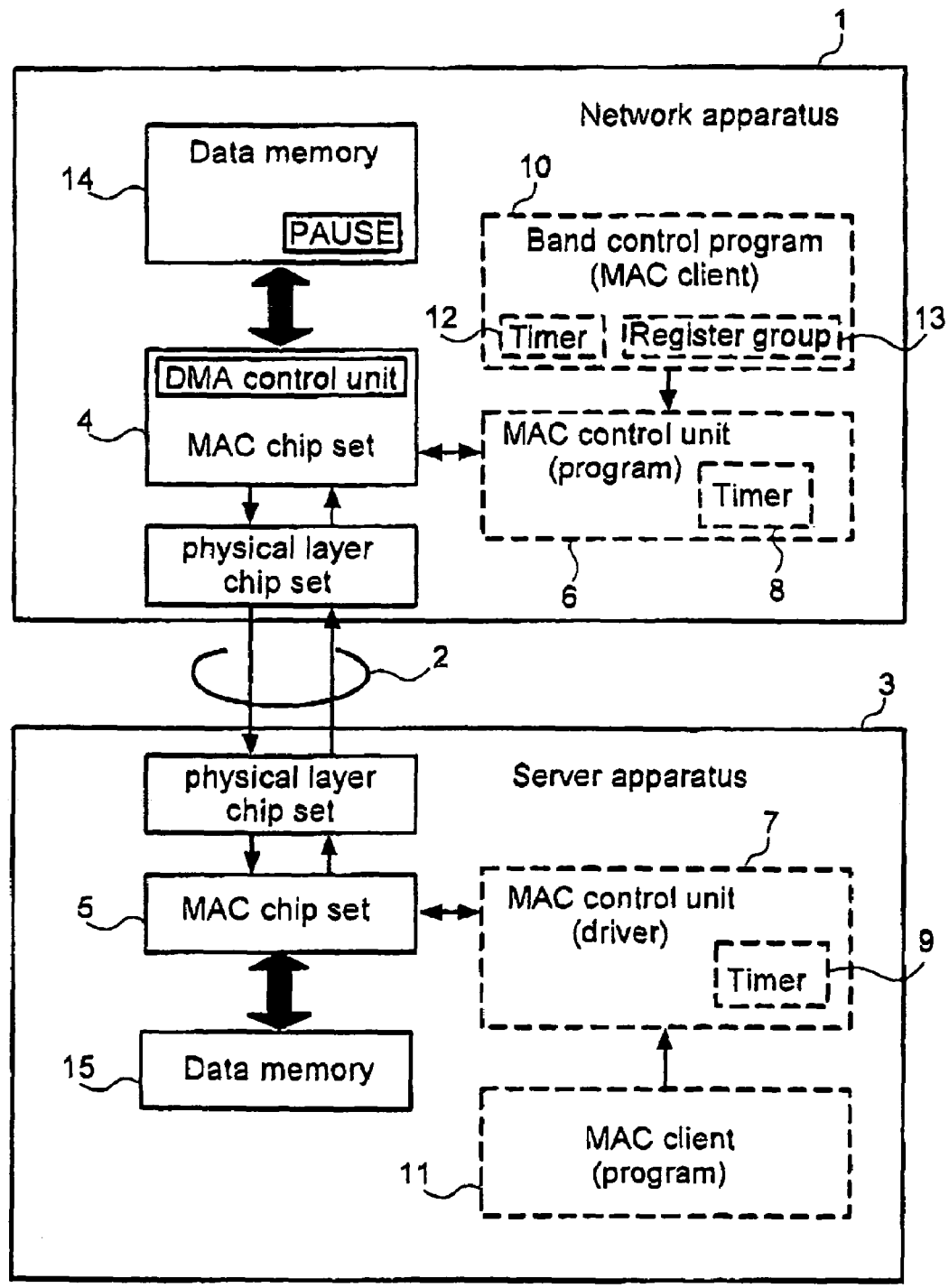
FIG. 1 is a configuration view of a network system using a network apparatus 1 according to an embodiment of the present invention.

FIG. 1 shows a network system comprising a network apparatus 1 and a server apparatus 3 connected to the network apparatus 1 by a link 2. The link 2 is a physical transmission medium used for full duplex communication between the network apparatus 1 and the server apparatus 3. The network apparatus 1 and the server apparatus 3 are provided with MAC chip sets 4 and 5 as well as MAC control units 6 and 7, respectively. The MAC chip sets 4 and 5 as well as MAC control units 6 and 7 are each provided with the PAUSE function specified in IEEE802.3x. In the figure, the MAC chip sets 4 and 5, physical layer chip sets, and data memories 14 and 15 are each composed of hardware and software. The MAC control units 6 and 7, band control programs 10 and 11, PAUSE timers 8 and 9, a timer 12, a register group 13 are each composed of software.

The band control program 10 includes a MAC client program. The band control program 10 is provided with the timer 12 and the register group 13. The register group 13 comprises a plurality of registers to set the band use ratio n (%) of the transmission traffic of the server apparatus 3, PAUSE time a, and a PAUSE transmission interval b.

The band use ratio n is the ratio between the physical communication band of the link 2 and the portion of the physical communication band of the link 2 used by the transmission band of a frame transmitted from the server apparatus 3. The PAUSE time a is the time during which a PAUSE frame suspends the transmission of a frame from the server apparatus 3. The PAUSE transmission interval b is the interval at which a PAUSE frame is transmitted.

The network administrator sets the band use ratio n of the server apparatus 3 with respect to the communication band of the link 2. The value of the band use ratio n is set in one of the registers in the register group 13. The PAUSE transmission interval b is a predetermined value, which is set in one of the registers in the register group 13.

The band control program 10 calculates the PAUSE time a from the value of the PAUSE transmission interval b and the value of the band use ratio n. After calculating the PAUSE time a, the band control program 10 creates a PAUSE frame including the PAUSE time a to store it in the data memory 14. The band control program 10 provides an instruction for the transmission of the PAUSE frame. The MAC chip set 4 reads from the data memory 14 the PAUSE frame in which the specified PAUSE time a is set, according to the instruction for the transmission of the PAUSE frame. The PAUSE frame read from the data memory 14 is transmitted by the MAC chip set 4. Incidentally, it is also possible to provide a configuration in which the band control program 10 provides an instruction for the transmission of the PAUSE time a and the PAUSE frame, and then the MAC chip set 4 creates the PAUSE frame in which the specified PAUSE time a is set, according to the instruction.

The relation between the PAUSE time a, the PAUSE transmission interval b, and the band use ratio n will be described.

The relation between the PAUSE time a, the PAUSE transmission interval b, and the band use ratio n is expressed by an equation 1.

$$(b-a)/b = n/100 \quad \text{(Equation 1)}$$

Specifically, the ratio between the time during which the server apparatus 3 is allowed to perform transmission by the PAUSE function and the PAUSE transmission interval b is (b−a)/b. The PAUSE time a is determined in such a manner that the value of the above ratio equals the value of n/100 set by the network administrator or the user.

According to the IEEE802.3x standard, there are two types of delay, that is, delay in PAUSE frame transmission when the network apparatus 1 transmits the PAUSE frame and delay in a PAUSE start when the receiving server apparatus 3 starts PAUSE. This delay occurs when the network apparatus 1 or the server apparatus 3 is transmitting a frame. The length of the delay corresponds to the length of the frame being transmitted. In addition, if the server apparatus 3 receives the next PAUSE frame during a PAUSE period, the server apparatus 3 overwrites the data in the PAUSE timer 8 on receiving the PAUSE frame.

The delay in PAUSE transmission or in a PAUSE start must be taken into consideration so that the effect of the transmission of a large-size frame will not be produced on the relational equation 1. Thus, the PAUSE time a and the PAUSE transmission interval b needs to satisfy a relational equation 2 with respect to the maximum frame size M (unit: byte) that the server-apparatus 3 transmits.

$$b - a > 2 \times M/64 \quad \text{(Equation 2)}$$

Here, the units of 64 are bytes/time, and represent the number of frame bytes transmitted per unit time, as described above.

Figure 13:
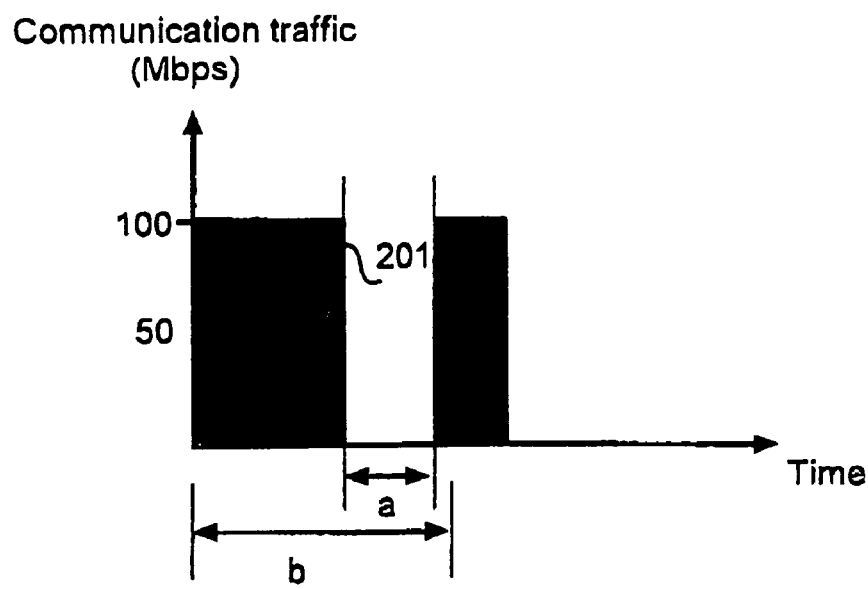
FIG. 13 is a graph showing the relation between PAUSE time a and PAUSE transmission interval b.

The equation 2 is described with reference to FIG. 13. FIG. 13 is a graph showing the relation between the PAUSE time a and the PAUSE transmission interval b. FIG. 13 shows the transmission traffic for the transmission time during which a frame of M bytes is transmitted. If the network apparatus is transmitting a frame of M bytes to the transmission link 2 when a PAUSE frame is to be transmitted, the maximum delay time M/64 for PAUSE frame transmission occurs. Incidentally, M/64 is the time spent in transmitting a frame of M bytes. In addition, If the server apparatus 3 is transmitting a frame of M bytes to the transmission link 2 when the server apparatus 3 is to start PAUSE after receiving a PAUSE frame, the maximum delay time M/64 until the start of PAUSE is further added. As described with respect to the equation 1, the band control is performed by the ratio between the PAUSE time a and the PAUSE transmission interval b. Therefore the PAUSE time a needs to be contained within the PAUSE transmission interval b. Thus the conditional equation 2 is required.

Moreover, during the period when the server apparatus 3 is pausing, the transmission data from an application contained in the server apparatus 3 is held in the data memory 15. However, the application in the server apparatus 3 requests the server apparatus 3 to perform transmission sequentially. Therefore overflow in the data memory 15 during a PAUSE period must be prevented. Thus, the capacity C of the data memory 15 and the PAUSE time a needs to satisfy a relational equation 3.

$$C > 64 \times a \text{(unit:byte)} \quad \text{(Equation 3)}$$

Here, the units of 64 are bytes/PAUSE time.

The maximum value of the PAUSE time a is determined from the conditions of the equation 3. Next, the minimum value of the PAUSE transmission interval b is determined from the equation 2. The minimum value of the band use ratio n is obtained from the value of the PAUSE time a, the value of the PAUSE transmission interval b, and the equation 1. If the value of the PAUSE transmission interval b is high, the minimum value of the band use ratio n of the transmission traffic of the server apparatus 3 becomes high, resulting in a narrow communication band range that can be set by the network administrator. The value of the PAUSE transmission interval b is set by taking the above conditions into consideration.

Figure 2:
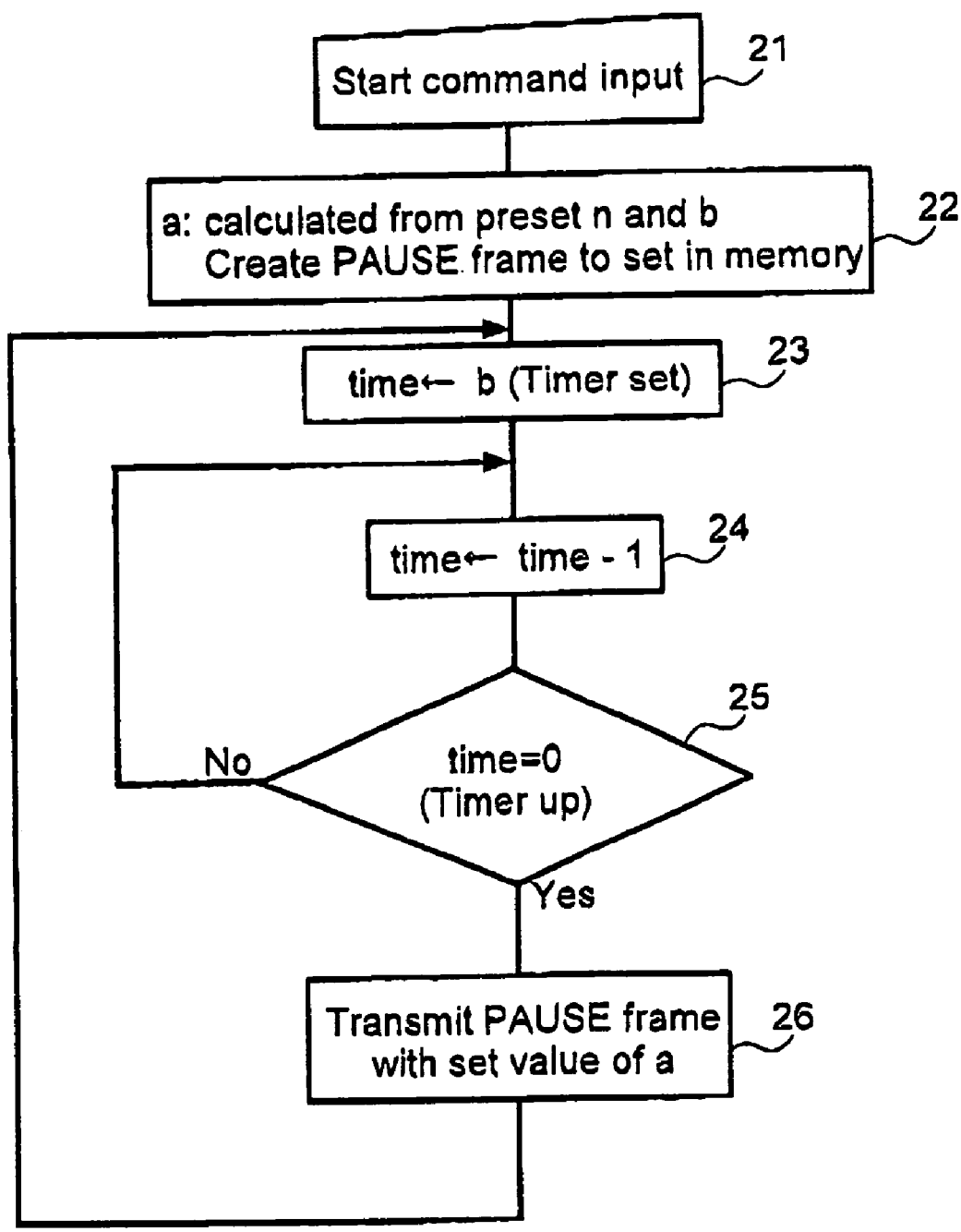
FIG. 2 is a flowchart showing the processing flow of a band control program 10.

FIG. 2 shows the processing flow of the band control program 10.

The band control program 10 is started by a command inputted by the network administrator (step 21). The value of the band use ratio n is either set by the network administrator when the command is inputted or read from files for resetting parameters, which are preset in the network apparatus 1. The PAUSE transmission interval b is incorporated in advance in the band control program 10. The band control program 10 calculates the value of the PAUSE time a when it is started, and creates a PAUSE frame to store it in the data memory 14 (step 22). Next, the band control program 10 sets the value of the PAUSE transmission interval b in the timer 12 (step 23). One subtraction operation is performed at the timer 12 per 512-bit time (or 5.12 microseconds for a 100-Mbps link) (step 24). When the time in the timer 12 is up (step 25), the band control program 10 instructs the MAC control unit 6 to transmit the PAUSE frame (It is hereinafter referred to as a PAUSE transmission instruction.) (step 26).

When receiving the PAUSE transmission instruction, the MAC control unit 6 instructs the MAC chip set 4 to perform DMA (Direct Memory Access) to the data memory 14. After receiving the instruction, the MAC chip set 4 performs DMA to the data memory 14 to read the PAUSE frame from the data memory 14. The MAC chip set 4 transmits the PAUSE frame read from the data memory 14. The DMA is controlled by a DMA control unit in the MAC chip set 4.

The series of processing steps as shown in FIG. 2 is repeated with the PAUSE transmission interval b used as cycle time. The MAC chip set 5 and the MAC control unit 7 in the server apparatus 3, having received the PAUSE frame, perform PAUSE during the specified period of the PAUSE time a. As a result of the PAUSE performance, it is possible to control the transmission traffic from the server apparatus 3 to n % or less of the transmission band of the link 2.

The present embodiment is not limited to the network system comprising the network apparatus 1 and the server apparatus 3 as shown in FIG. 1.

Figure 15:
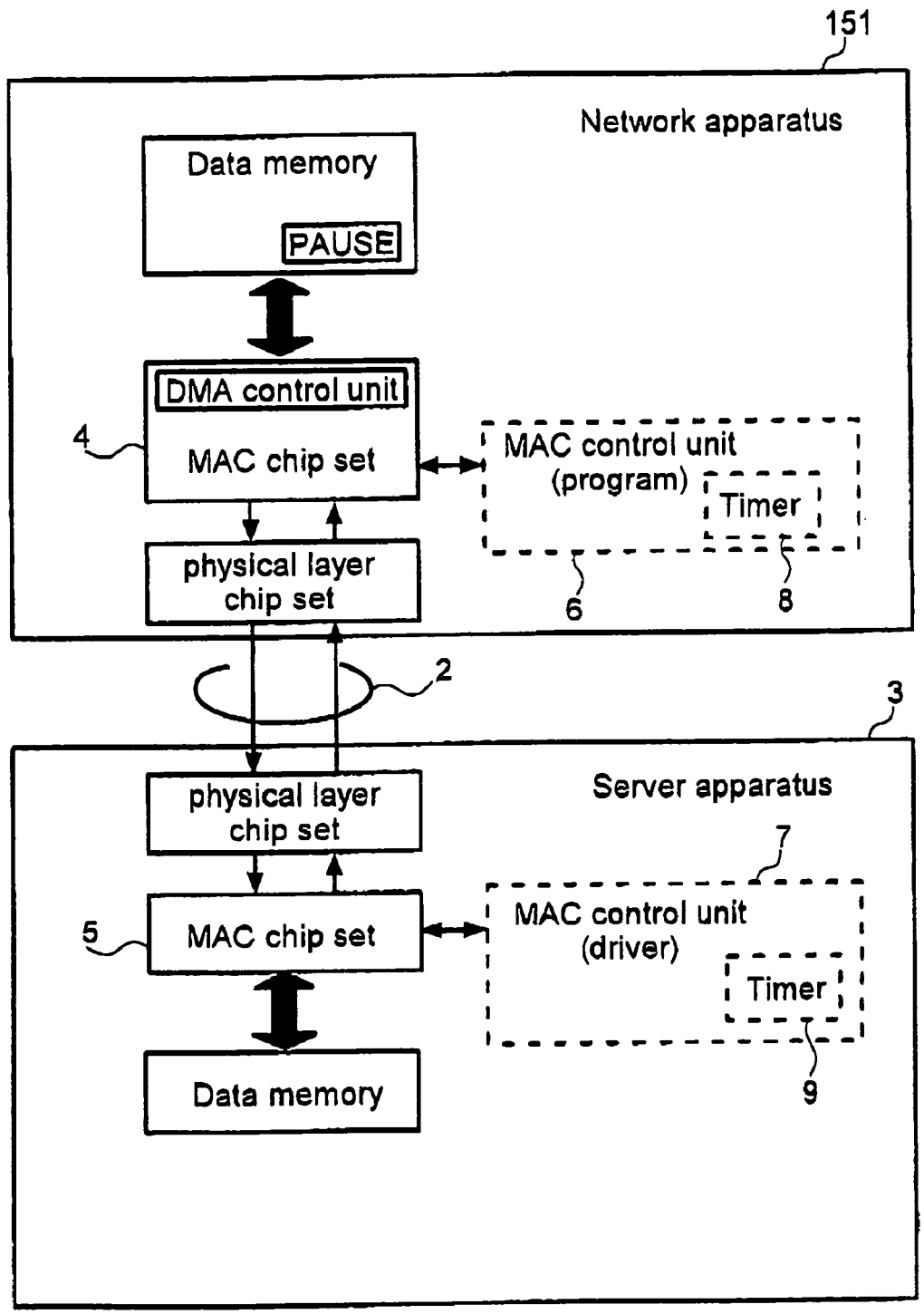
FIG. 15 is a configuration view of a network using a network apparatus 151.

A network apparatus 151 shown in FIG. 15 is provided with the same network interface control unit as that of the server apparatus 3 shown in FIG. 1. Therefore, the present embodiment is also applied to a system in which the server apparatus 3 is replaced with the network apparatus 151.

The present embodiment is also applied to a system in which network apparatus 1 are connected to each other.

Network apparatus are not limited to apparatus such as hubs, LAN switches, or routers, and includes apparatus in general which exchange information through a network system, such as PCs (Personal Computers) and servers.

Figure 9:
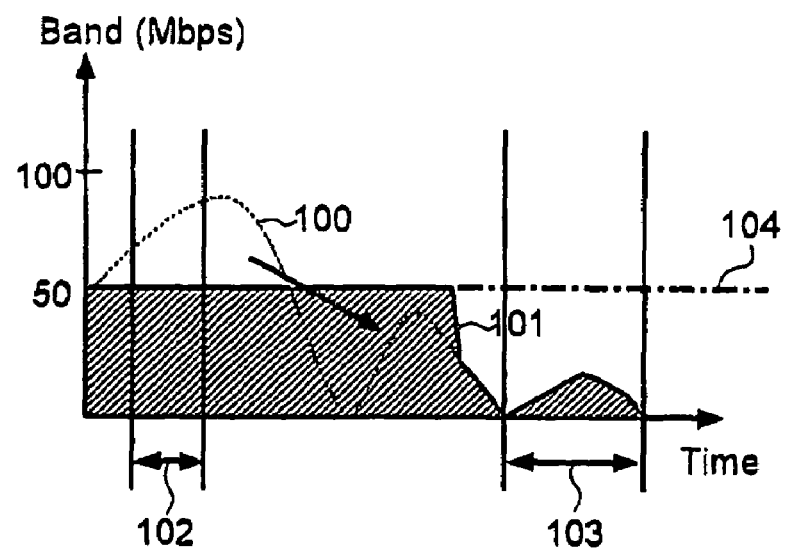
FIG. 9 is a graph showing server transmission traffic.

Server transmission traffic according to the present embodiment is shown in FIG. 9. A dotted line 100 shows the transmission traffic that an application in the server apparatus 3 requests. A solid line 101 shows transmission traffic on the link 2 according to the present embodiment. In this figure, the total communication band of the link 2 is 100

Mbps, while the band use ratio n set by the network administrator is 50%. As shown in FIG. 9, the request for the portion of the transmission traffic requested by the application in the server apparatus 3 that exceeds the band use ratio n of 50% is handled later in time, and is shifted to a time zone where the volume of traffic requested is small. The communication band that corresponds to the band use ratio n set by the network administrator is 50 Mbps (104).

It is shown in the graph in FIG. 9 that the transmission traffic 101 on the link 2 is always within the set band 104. However, this is true only when the graph is expressed with a macroscopic time axis.

Figure 10:
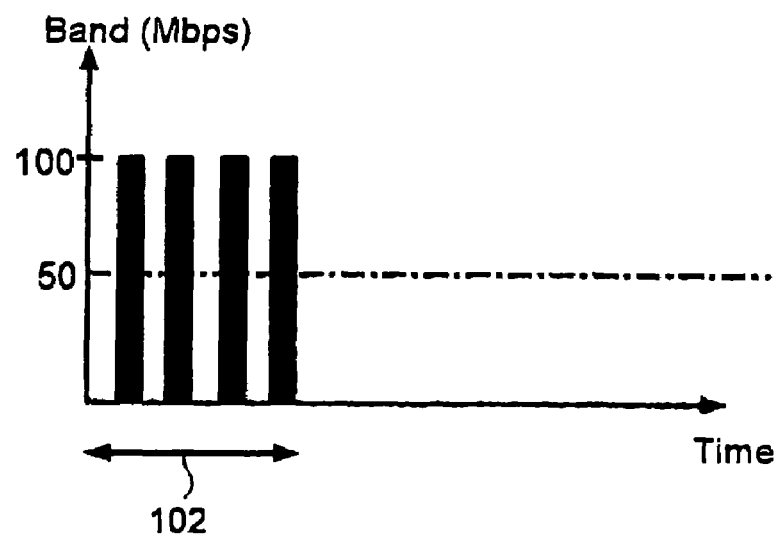
FIG. 10 is a graph in which the time axis of a time zone 102 shown in FIG. 9 is magnified.

FIG. 10 is a graph in which a time zone 102 shown in FIG. 9 is magnified. If the graph is expressed with a microscopic time axis, the time zones where transmission traffic is zero and the time zones where transmission traffic is 100 Mbps are repeated alternately. In this figure, the time zones where transmission traffic is zero indicate the presence of a state in which the server apparatus 3 is pausing. The time zones where transmission traffic is 100 Mbps indicate the presence of a state in which the server apparatus 3 is transmitting a frame. The average of the total traffic in the time zone 102 is within the communication band 50 Mbps (104), which corresponds to the band use ratio n.

Figure 11:
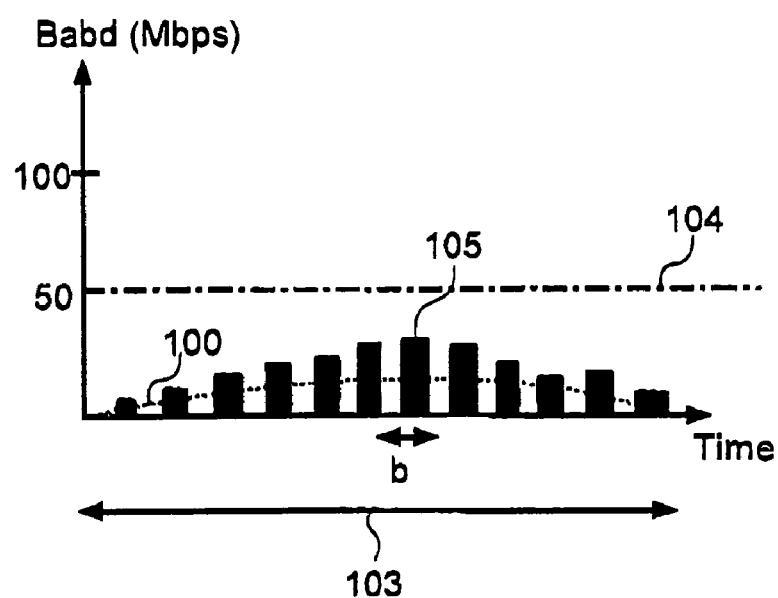
FIG. 11 is a graph in which the time axis of a time zone 103 shown in FIG. 9 is magnified.

In the embodiment described above, the network apparatus 1 periodically transmits a PAUSE frame regardless of the transmission traffic of the server apparatus 3. Therefore, even if the traffic transmitted by the server apparatus 3 is within the band use ratio n set by the network administrator, the server apparatus 3 stops frame transmission by receiving a PAUSE frame. FIG. 11 is a graph regarding this matter, in which the time axis of a time zone 103 shown in FIG. 9 is magnified. The dotted line 100, as described above, shows the transmission traffic requested by the application in the server apparatus 3. In the figure, there are time zones where transmission traffic on the link 2 is zero. However, the application in the server apparatus 3 requests frame transmission even in the time zones where transmission traffic on the link 2 is zero. Therefore, when transmission is resumed by the server apparatus 3, the frame is transmitted together with the portion of the traffic 100 requested in the time zone where transmission traffic is zero, which should fundamentally have been transmitted in that time zone. In the time zone where transmission traffic on the link 2 is zero, data transmission is temporarily stopped, and the data stays in the data memory 15. The transmission data is sent out all at once when transmission is resumed by the server apparatus 3.

In this case, the average transmission traffic volume for the period of the PAUSE transmission interval b is not affected. However, in transmission of each frame, there occurs delay in transmission where the value of the PAUSE time a represents the maximum value of the delay.

Figure 12:
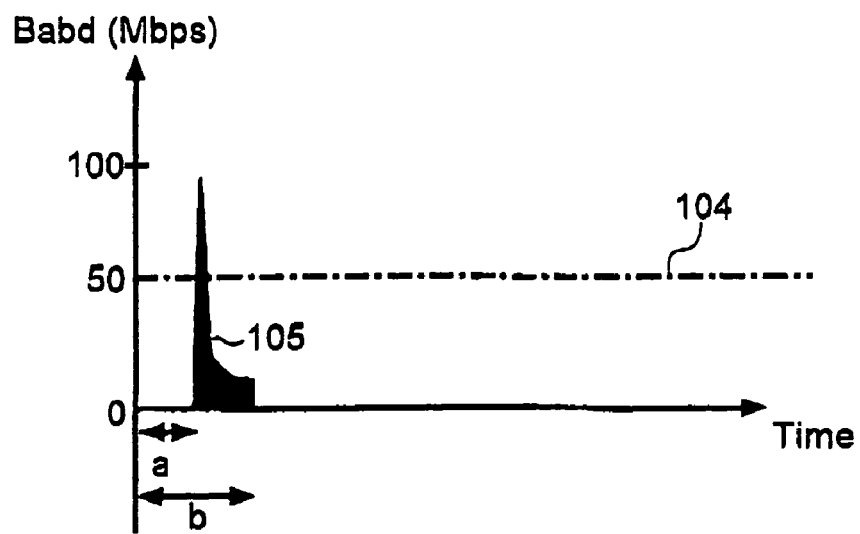
FIG. 12 is a graph showing a magnified waveform of the server transmission traffic 105 shown in FIG. 11.

FIG. 12 accurately shows the waveform of the transmission traffic 105 in this case.

Next, an embodiment which makes it possible to perform band control without causing such transmission delay will be described.

Figure 3:
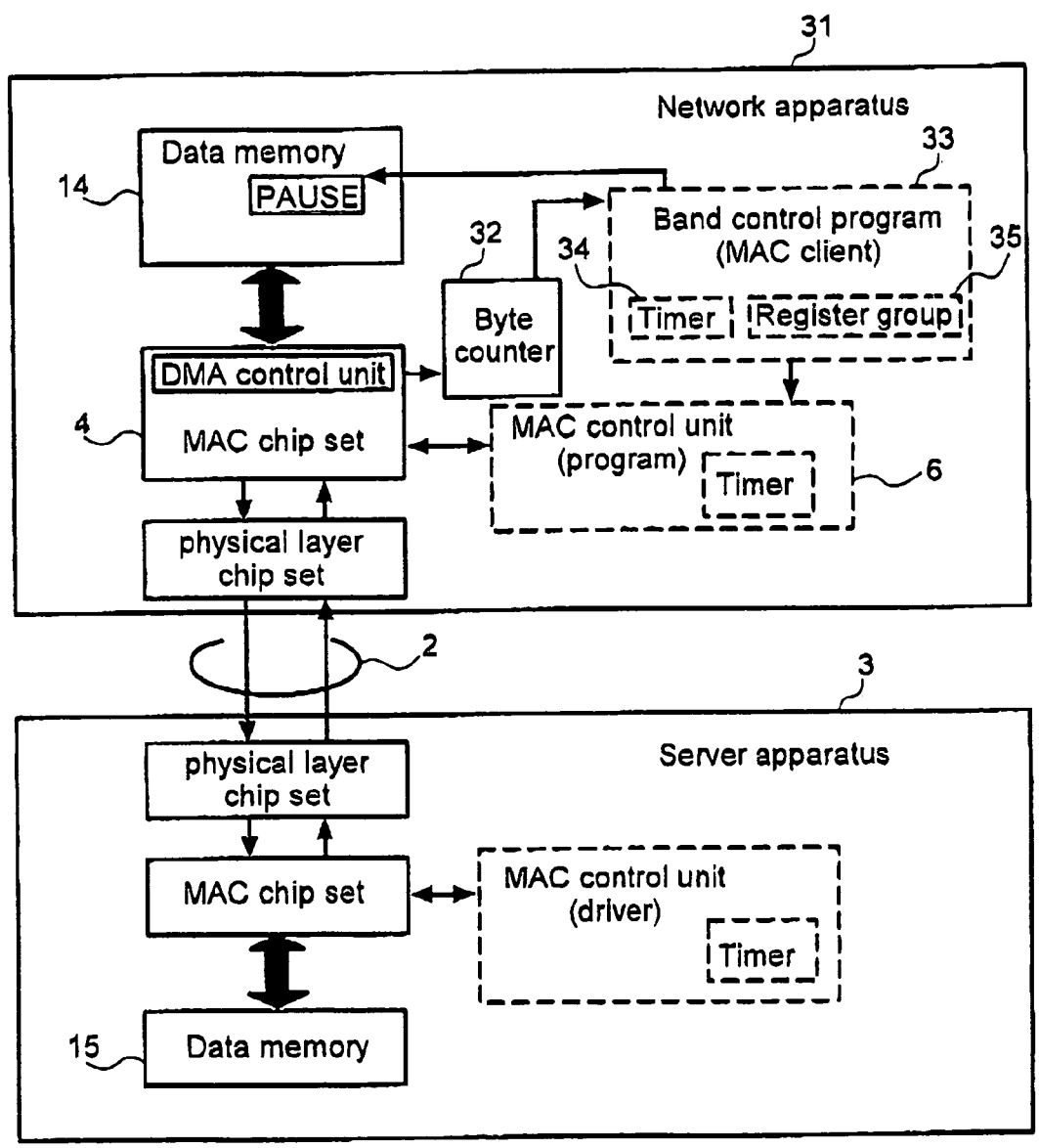
FIG. 3 is a configuration view of a network system using a network apparatus 31 according to another embodiment of the present invention.

A network apparatus 31 shown in FIG. 3 is newly provided with a byte counter 32, as compared with the network apparatus 1 in FIG. 1. The byte counter 32 comprises hardware and software.

In FIG. 3, the byte counter 32 actually measures the transmission traffic from a server apparatus 3. The band control program 33 calculates PAUSE time e by using the measured value of the byte counter 32. The calculated PAUSE time e is set into a PAUSE frame, as in the first embodiment, to be transmitted to the server apparatus 3.

The actual transmission traffic of the server apparatus 3 is observed by the byte counter 32. Based on the observed value, the network apparatus 31 transmits a PAUSE frame to the server apparatus 3 only when the transmission traffic of the server apparatus 3 exceeds the band use ratio n. Thus, the timing of PAUSE frame transmission is determined on a variable basis by the network apparatus 31.

Specific description is provided as follows.

The band control program 33 has a timer 34 and a register group 35. The register group 35 has a register n, a register c, and a register p.

The network administrator sets the value of the band use ratio n (%) of the server apparatus 3 with respect to the communication band of the link 2. The value of the band use ratio n is set in the register n in the register group 35.

The band control program 33 observes the traffic of the link 2 each time traffic observation time c has passed. The network administrator sets the traffic observation time c in advance. The traffic observation time c is set in the register c. The traffic observation time c is the time interval at which the band control program 33 reads the value measured by the byte counter 32.

Permissible traffic p (unit: byte) is calculated based on the band use ratio n. The permissible traffic p is set in the register p.

The byte counter 32 measures the transmission traffic x (unit: byte) from the server apparatus 3. The band control program 33 checks the server transmission traffic x measured by the byte counter 32 each time traffic observation time c has passed. The band control program 33 creates a PAUSE frame if the server transmission traffic x exceeds the permissible traffic p. The band control program 33 calculates PAUSE time e that satisfies a relational equation 4. The band control program 33 creates a PAUSE frame after calculating the PAUSE time e. The PAUSE time e is, as in the first embodiment, the time during which a PAUSE frame suspends the transmission of a frame from the server apparatus 3.

$$x/(64\times(c+e)) \leq n/100 \quad \text{(Equation 4)}$$

The PAUSE time e is determined in such a way that the band use ratio of the server transmission traffic x in the total time of the traffic observation time c and the PAUSE time e becomes equal to or less than n/100, the value set by the user.

The permissible traffic p is used as criterion for issuing a PAUSE frame. The permissible traffic p is obtained from an equation 5.

$$p = 64 \times c \times n/100 \quad \text{(Equation 5)}$$

Here, the units of 64 are bytes/time, and represent the number of frame bytes transmitted per unit time.

An equation 6 is obtained from equations 4 and 5. The equation 6 is an expression for calculating the PAUSE time e. In reality, the PAUSE time e becomes the minimum integral value that satisfies the equation 6 for x−p>0.

$$e \geq ((x-p)/64) \times (100/n) \quad \text{(Equation 6)}$$

As in the case of the embodiment in FIG. 1, there are limitations to the traffic observation time c in terms of implementation. The limitations in terms of implementation means the limitation imposed by the maximum frame size M transmitted by the server apparatus 3 or the limitation imposed by the capacity C of the data memory 15 incorporated in the server apparatus 3. The limitations in terms of implementation are expressed by equations 7 and 8. The equations 7 and 8 correspond to the equations 2 and 3 respectively.

$$c > 2 \times M/64 \quad \text{(Equation 7)}$$

$$c > 64 \times c \times (100-n)/n \quad \text{(Equation 8)}$$

Figure 14:
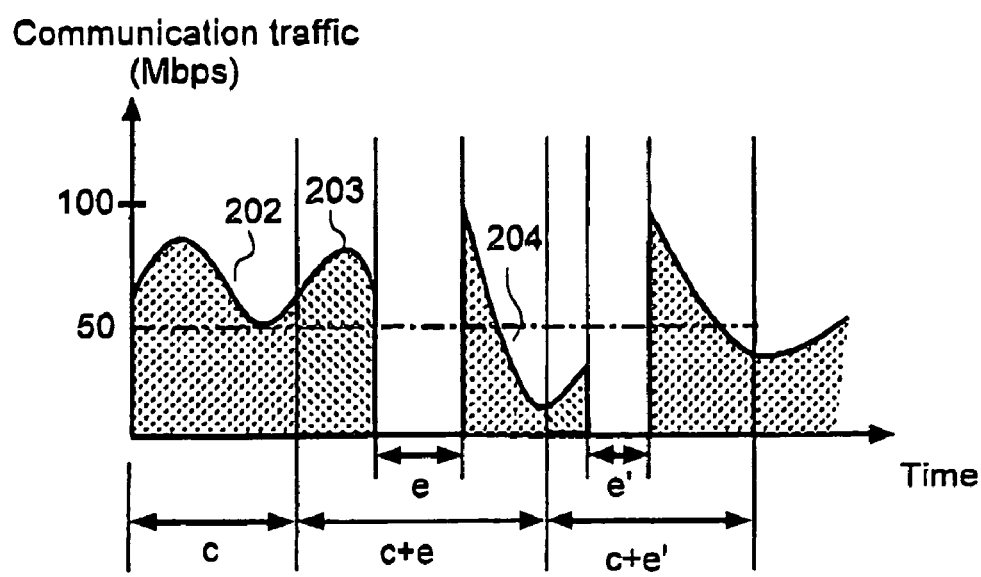
FIG. 14 is a graph showing the relation between traffic observation time c, server transmission traffic x, permissible traffic p, and PAUSE time e.

The relation between the traffic observation time c, the server transmission traffic x, permissible traffic p, and the PAUSE time e described above is shown in FIG. 14. The communication traffic 202 is server transmission traffic x measured in the traffic observation time c. The communication traffic 203 is server transmission traffic for a period until PAUSE is performed by the server apparatus 3 in a period c+e after the traffic observation time c has passed. The communication traffic 204 is server transmission traffic for a period after PAUSE is performed by the server apparatus 3 in the period c+e after the traffic observation time c has passed.

If the server transmission traffic x exceeds the permissible traffic p in the equation 5, the band control program 33 calculates the PAUSE time e from the equation 6. The band control program 33 provides an instruction for the transmission of a PAUSE frame. The PAUSE frame is transmitted from the network apparatus 31. The server apparatus 3 receives the PAUSE frame and performs PAUSE.

In the network apparatus 31, the byte counter 32 continues to observe the server transmission traffic x for the observation time c+e after the traffic observation time c has passed. As a result of the observation, the band control program 33 obtains the value of server transmission traffic x' which combines the traffic 203 and the traffic 204. In some cases, the server transmission traffic x' exceeds the permissible traffic p again. In this case, the band control program 33 calculates PAUSE time e' again to provide an instruction for the transmission of the next PAUSE frame. Then, these operations are repeated between the server apparatus 3 and the network apparatus 31.

Figure 4:
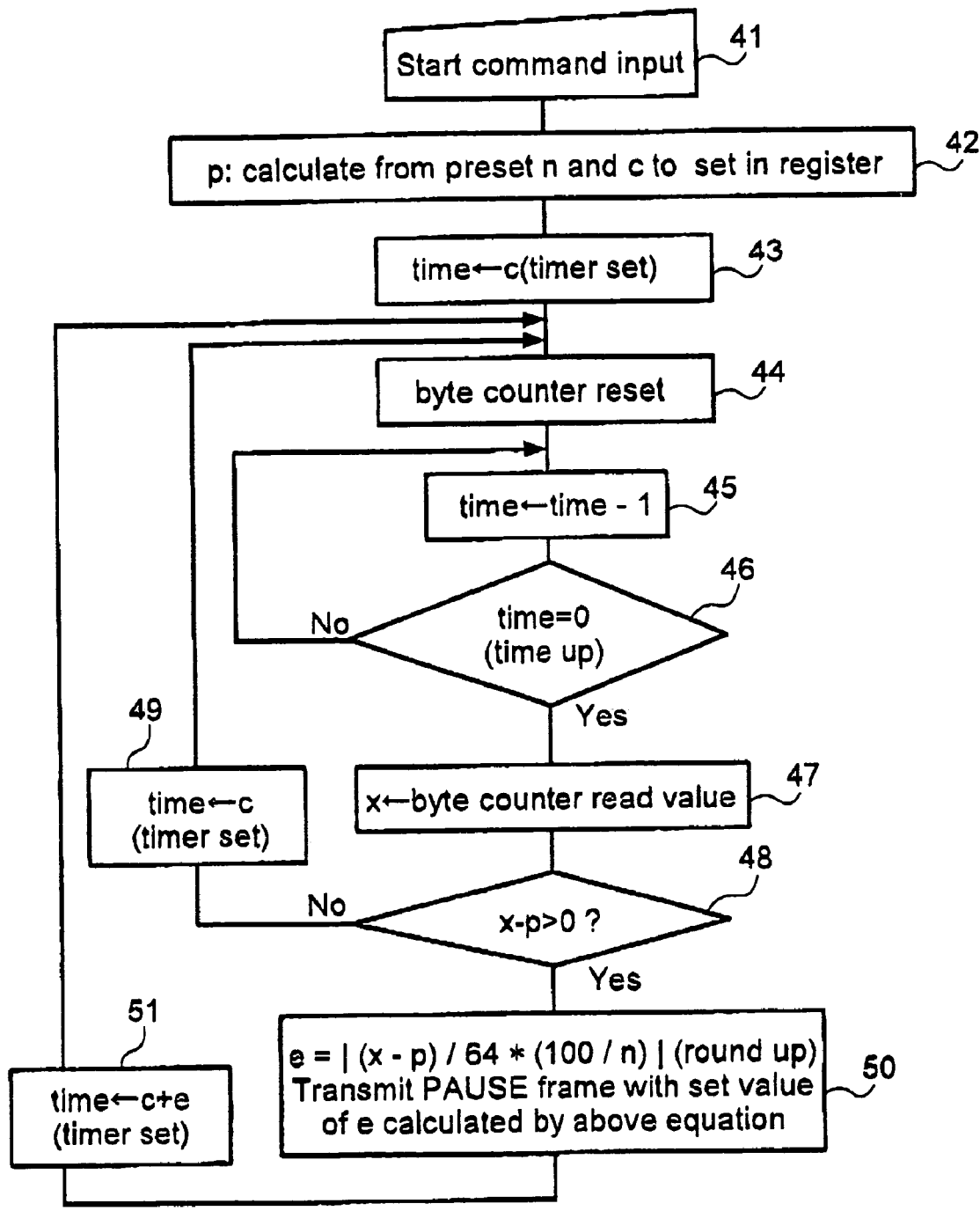
FIG. 4 is a flowchart showing the processing flow of a band control program 33.

FIG. 4 shows the processing flow of the band control program 33.

The band control program 33 is started by a command inputted by the network administrator (step 41). The value of the band use ratio n is either set by the network administrator when the command is inputted or read from configuration files and the like, which are preset in the network apparatus 31. The traffic observation time c is incorporated in advance in the band control program 33. The band control program 33 calculates the value of permissible traffic p when the program is started, and sets the value of permissible traffic p in the register p (step 42). The band control program 33 sets the value of the traffic observation time c in the timer 34 (step 43), and resets the byte counter 32 (step 44). One subtraction operation is performed at the timer 34 per 512-bit time (or 5.12 microseconds for a 100-Mbps link) (step 45). When the time in the timer 34 is up as a result of the subtraction operations (step 46), the band control program 33 reads the server transmission traffic x measured by the byte counter 32 (step 47). The band control program 33 determines whether or not the server transmission traffic x exceeds the communication band volume corresponding to the band use ratio n (step 48). If the server transmission traffic x does not exceed the communication band volume corresponding to the band use ratio n, the band control program 33 resets the value of traffic observation time c in the timer 34 (step 49) and repeats the processing at and after the step 44.

On the other hand, if the band control program 33 determines at the step 48 that the server transmission traffic x exceeds the communication band volume corresponding to the band use ratio n, the band control program 33 calculates PAUSE time e. The band control program 33 creates a PAUSE frame with a set value of PAUSE time e to store it in the data memory 14. The band control program 33 instructs the MAC control unit 6 to transmit the PAUSE frame (step 50). When receiving the PAUSE transmission instruction, the MAC control unit 6 instructs the MAC chip set 4 to perform DMA (Direct Memory Access) to the data memory 14. The MAC chip set 4 performs DMA to the data memory 14 according to the instruction from the MAC control unit 6 to read the PAUSE frame from the data memory 14. The MAC chip set 4 transmits the PAUSE frame read from the data memory 14. Following the step 50, the band control program 33 newly sets a value of observation time c+e in the timer 34 (step 51). The band control program 33 repeats the processing at and after the step 44. The band control program 33 sets a value of observation time c+e in the timer 34 for the following reason. When a PAUSE transmission instruction is issued from the network apparatus 31 while the server apparatus 3 is transmitting a frame, there occurs a time lag between the reception of the PAUSE transmission instruction by the server apparatus 3 and the start of PAUSE frame transmission by the server apparatus 3. Therefore, the server transmission traffic needs to be observed in such a way that the total of time during which the server apparatus 3 can perform frame transmission almost equals the traffic observation time c.

By repeating the series of steps as shown in FIG. 4, the server apparatus 3 performs PAUSE for the specified PAUSE time e. As a result, the server transmission traffic x does not exceed the band use ratio n on the link 2. Moreover, the network apparatus 31 transmits a PAUSE frame only when the server transmission traffic x exceeds the band use ratio n. Therefore, the server apparatus 3 does not delay frame transmission unnecessarily while the server transmission traffic x does not exceed the band use ratio n.

Next, there is provided a description of an example in which the band control function described above is applied to another network system.

Figure 5:
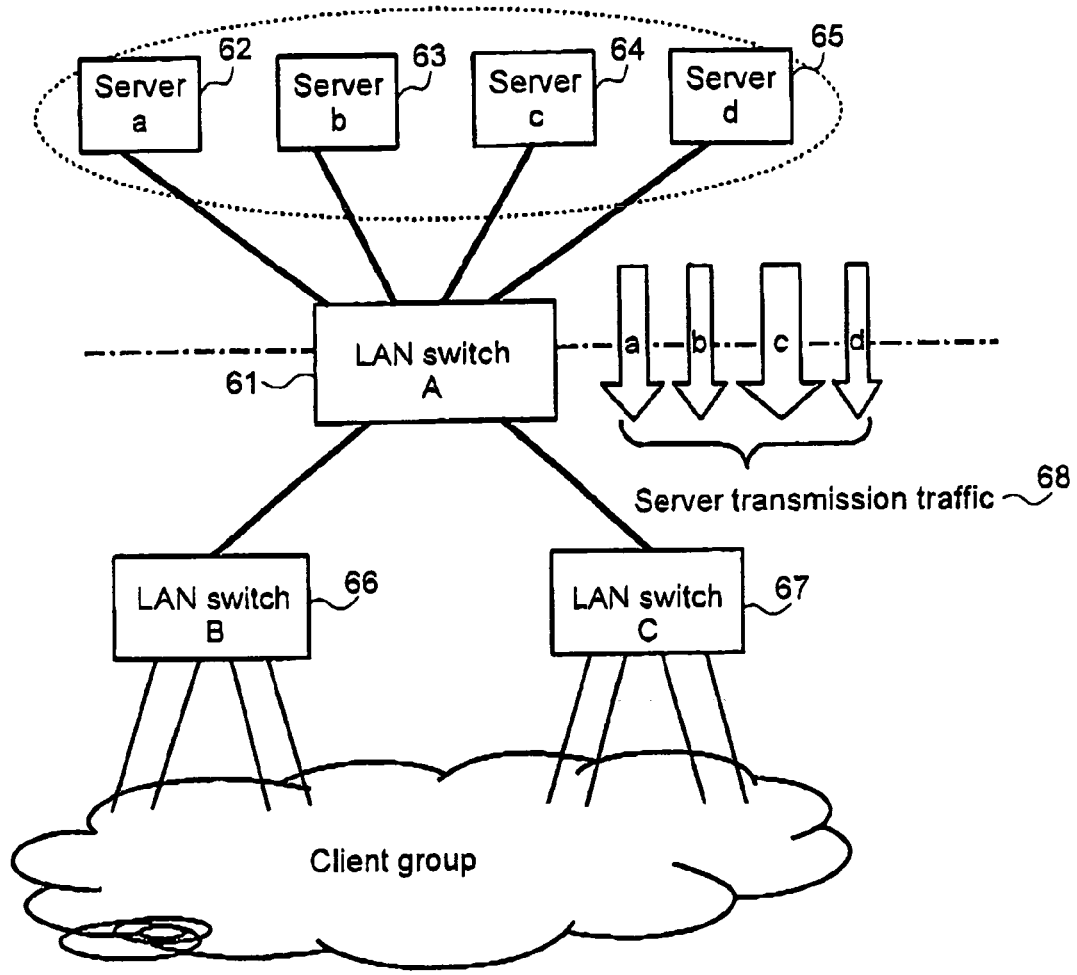
FIG. 5 is an example of a configuration of a network system.

FIG. 5 shows the configuration of the network system in this example.

In this network system, a network apparatus is connected with a plurality of physical links. A plurality of server apparatus are each connected to one of the plurality of physical links.

In this example, a network apparatus is described as a LAN switch. A LAN switch is provided with the band control function described above. It should be noted, however, that the network apparatus is not limited to a LAN switch, and it can be any network apparatus that supports the techology of the IEEE802.3x standard.

A server apparatus group comprises a server apparatus a 62, and a server apparatus b 63, a server apparatus c 64, and a server apparatus d 65. A LAN switch A 61 is connected to the server apparatus group. Each of the server apparatus is connected to the LAN switch A 61 by a link capable of full duplex communication. The LAN switch A 61 is provided with a plurality of ports (not shown in the figure) for each connectecting to one of the server apparatus via the link. The LAN switch A 61 has the band control program 10 or the band control program 33 described above (hereinafter referred to as "band control program 10 or 33"). The LAN system A 61 is provided with a plurality of MAC chip sets and MAC control units. Each of the MAC chip sets and MAC control units corresponds to one of the ports. Since each of the ports corresponds to one of the server apparatus to which it is connected via the link, each of the MAC chip sets and MAC control units corresponds to one of the server apparatus. Each of the MAC chip sets and MAC control units is controlled by the band control program 10 or 33. Only one band control program 10 or 33 exists for all of the MAC control units. The LAN switch A 61 may also be configured in such a manner that a plurality of band control programs 10 or 33 exist, with each of the band control programs 10 or 33 corresponding to one of the MAC control units.

The LAN switch A 61 relays communication between the server apparatus group and a client group. The client group is connected to a LAN switch B 66 and a LAN switch C 67. The LAN switch B 66 and the LAN switch C 67 are each connected to the LAN switch A 61 via a separate link.

Each of the server apparatus a 62 to d 65 is provided with a different application. The server apparatus a 62 to d 65 may also be configured in such a manner that each of the server apparatus a 62 to d 65 is provided with the same application. The server transmission traffic generated from each of the server apparatus a 62 to d 65 is server transmission traffic a, server transmission traffic b, server transmission traffic c, and server transmission traffic d, respectively. The width of each of arrows a to d as shown in FIG. 5 represents server transmission traffic. The network administrator of the network system sets the band use ratios $n_a$, $n_b$, $n_c$, and $n_d$ of the server apparatus with respect to the communication bands of the links that connect the LAN switch A 61 to the server apparatus. After setting the band use ratios $n_a$, $n_b$, $n_c$, and $n_d$ of the server apparatus, the network administrator starts the band control program 10 or 33.

In the case of the band control program 10 shown in FIG. 1, the PAUSE transmission interval b is incorporated in advance in the band control program 10. PAUSE time a is calculated for each of the server apparatus based on its band use ratio. The band control program 10 creates a PAUSE frame for each of the server apparatus. The PAUSE time a calculated for each of the server apparatus is set in each of the PAUSE frames. The band control program 10 stores each of the PAUSE frames created for each of the server apparatus in a data memory, and sets the PAUSE transmission time a in a timer. When the time in the timer is up, the band control program 10 provides instructions for the transmission of each of the PAUSE frames for each of the server apparatus. The instructions are received by MAC control units each corresponding to one of the ports. Each of the MAC control units instructs the corresponding MAC chip set to perform DMA (Direct Memory Access) to the data memory. Each MAC chip set reads the PAUSE frame from the data memory, and transmits the PAUSE frame from the corresponding port to the link connected to it. Thus, the band control program 10 periodically provides an instruction for the transmission of a PAUSE frame to each of the server apparatus. Each of the server apparatus receives the PAUSE frame and performs PAUSE for the period of the PAUSE time a that is set in the PAUSE frame. The PAUSE time a set in the PAUSE frame that each of the server apparatus receives is a value calculated for the server apparatus, and therefore different from that of the other server apparatus. Thus each of the server apparatus performs PAUSE for a period of time that is different from those of the other server apparatus. However, the PAUSE time a of each of the server apparatus may coincide with that of another apparatus.

In the case of the band control program 33 as shown in FIG. 3, traffic observation time c is set by the network administrator. The traffic observation time c may be set for each of the server apparatus. The band control program 33 calculates permissible traffic p for each of the server apparatus based on its band use ratio. The LAN switch A 61 is provided with a byte counter. The byte counter measures the server transmission traffic of the frames transmitted from the server apparatus via the links for each of the server apparatus. The band control program 33 reads the server transmission traffic measured by the byte counter for each of the server apparatus each time the traffic observation time c has passed. The band control program 33 determines whether or not the server transmission traffic of any one of the server apparatus exceeds the permissible traffic p for the server apparatus. If the server transmission traffic of any one of the server apparatus exceeds the permissible traffic p for the server apparatus, the band control program 33 calculates PAUSE time e for the server apparatus. PAUSE time e is calculated based on the band use ratios $n_a$, $n_b$, $n_c$, and $n_d$ of the server apparatus and server transmission traffic, and therefore the values of PAUSE time e of the server apparatus differ from each other. However, the PAUSE time e of each of the server apparatus may coincide with that of another apparatus. The band control program 33 creates a PAUSE frame with a set value of PAUSE time e to store it in a data memory. The band control program 33 provides an instruction for the transmission of the PAUSE frame to the server apparatus. The instruction is received by a MAC control unit which corresponds to the server apparatus. The MAC control unit instructs the corresponding MAC chip set to perform DMA (Direct Memory Access) to the data memory. The MAC chip set reads the PAUSE frame from the data memory according to the instruction. The MAC chip set transmits the PAUSE frame from the corresponding port to the link connected to it. Thus, if the server transmission traffic of any one of the server apparatus exceeds the permissible traffic p for the server apparatus, the band control program 33 provides an instruction for the transmission of a PAUSE frame to the server apparatus. The server apparatus that has received the PAUSE frame performs PAUSE for the period of the PAUSE time e that is set in the PAUSE frame.

In the network system described above, the network administrator may set a single band use ratio n as the total value of the band use ratios $n_a$, $n_b$, $n_c$, and $n_d$ of the server apparatus. In this case, the band control program 33 calculates permissible traffic p based on the band use ratio n. The byte counter measures and sums the server transmission traffic of the frames transmitted from the server apparatus via the links. Thus the byte counter measures the server transmission traffic of all of the server apparatus. The band control program 33 reads the server transmission traffic measured by the byte counter each time the traffic observation time c has passed. The band control program 33 determines whether or not the server transmission traffic exceeds the permissible traffic p. If the server transmission traffic exceeds the permissible traffic p, the band control program 33 calculates PAUSE time e. The band control program 33 creates a PAUSE frame with a set value of PAUSE time e to store it in the data memory. The band control program 33 provides an instruction for the transmission of the PAUSE frame to all of the server apparatus. The instruction is received by all of the MAC control units. Each of the MAC control units instructs the corresponding MAC chip set to perform DMA (Direct Memory Access) to the data memory. Each MAC chip set reads the PAUSE frame from the data memory according to the instruction. Each MAC chip set transmits the PAUSE frame from the corresponding port to the link connected to it. Thus, if the server transmission traffic of all of the server apparatus exceeds the permissible traffic p, the band control program 33 provides an instruction for the transmission of a PAUSE frame to all of the server apparatus. Each of the server apparatus that has received the PAUSE frame performs PAUSE for the period of the PAUSE time e that is set in the PAUSE frame.

The server transmission traffic from the server apparatus group is controlled by operating the band control program 10 or 33 in such a way that each application provides a specified communication band volume.

In addition, the band control function described above is applicable to a network system in which a plurality of links connect a network apparatus to a single server apparatus. The network apparatus is provided with a plurality of MAC control units that correspond to the ports each connected to one of the links. Since each of the MAC control units operates independently, server transmission traffic is controlled for each of the links. The operation of such a network apparatus is effective when a single server apparatus is provided with a plurality of applications.

Figure 8:
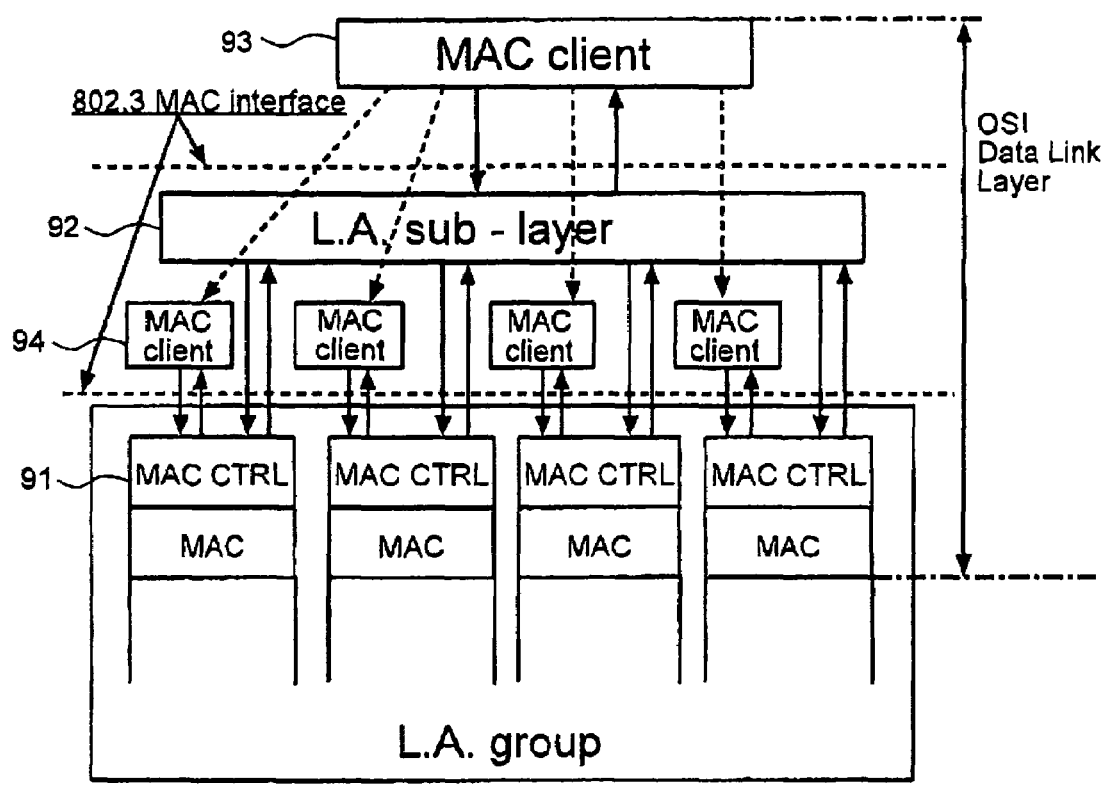
FIG. 8 is a configuration view showing the protocol relation in an OSI data link layer.

Currently, in IEEE802.3ad, standardization work for the link aggregation (LA) technology is under way. FIG. 8 shows the protocol relation in the data link layer of the OSI Basic Reference Model to which the link aggregation (LA) technology is applied.

The band control program 10 or 33 is implemented by two methods. In the first method, the band control program 10 or 33 is implemented as a host program 93 of an LA sub-layer 92. In this case, the band control program 10 or 33 corresponds to the MAC client 93 shown in FIG. 8. The LA sub-layer 92 exists for each LA group, which consists of a plurality of MAC control units 91. The LA sub-layer 92 controls each of the MAC control units 91 in the corresponding LA group in an integrated manner. The LA sub-layer 92 causes the MAC client 93, the host program, to recognize the plurality of MAC control units 91 in the corresponding LA group as a single MAC interface.

After the MAC client 93 provides an instruction for PAUSE transmission, the LA sub-layer 92 receives the instruction. The LA sub-layer 92 selects a certain MAC control unit from among the plurality of MAC control units in the corresponding LA group in given order, and sends the received instruction to the selected MAC control unit. Having received the instruction, the MAC control unit 91 performs processing according to the instruction.

Figure 6:
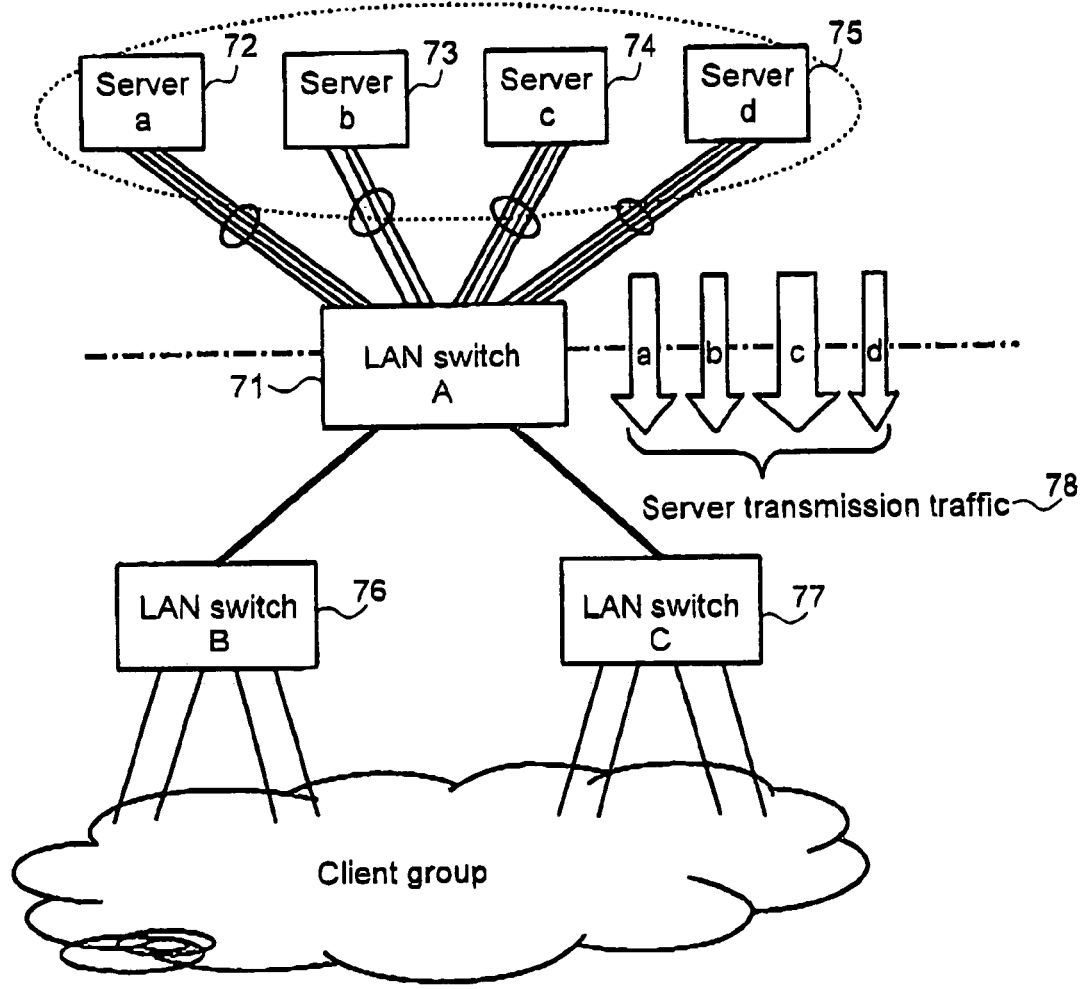
FIG. 6 is another example of a configuration of a network system.

An example of a network system in which the implementation method described above is applied will be described. FIG. 6 shows the configuration of the network system in this case.

Each of server apparatus a 72 to d 75 is connected to a LAN switch A 71 by a plurality of links. The LAN switch A 71 is connected to each of the server apparatus by the plurality of links that are connected to a plurality of ports. The LAN switch A 71 is provided with a MAC control unit and a MAC chip set for each of the ports that is connected to each of the links. In the plurality of MAC control units in LAN switch A 71, a plurality of MAC control units corresponding to a plurality of ports that are connected to one server apparatus comprise one LA group. Therefore, there are provided a plurality of LA groups consisting of a plurality of MAC control units in the LAN switch A 71, and each of the LA groups corresponds to one of the server apparatus. The LAN switch A 71 is provided with an LA sub-layer for each of the LA groups. Each LA sub-layer controls the plurality of MAC control units in the corresponding LA group. In addition, the LAN switch A 71 is provided with one band control program.

As in the case of FIG. 5, each of the server apparatus is provided with a different application from those of the other server apparatus. The server transmission traffic generated by each of the server apparatus is server transmission traffic a, server transmission traffic b, server transmission traffic c, and server transmission traffic d, respectively. The width of each of arrows a to d as shown in FIG. 6 represents server transmission traffic. The LAN switch A 71 has the band control function described above. The network administrator of the network system sets the band use ratios $n_a$, $n_b$, $n_c$, and $n_d$ of the server apparatus. After setting the band use ratios $n_a$, $n_b$, $n_c$, and $n_d$ of the server apparatus, the network administrator starts the band control program 10 or 33.

In the case of the band control program 10 shown in FIG. 1, the PAUSE transmission interval b is incorporated in advance in the band control program 10. PAUSE time a is calculated for each of the server apparatus based on its band use ratio. The band control program 10 creates a PAUSE frame for each of the server apparatus. The PAUSE time a calculated for each of the server apparatus is set in each of the PAUSE frames. The band control program 10 stores each of the PAUSE frames created for each of the server apparatus in a data memory, and sets the PAUSE transmission time a in a timer. When the time in the timer is up, the band control program 10 provides instructions for the transmission of each of the PAUSE frames for each of the server apparatus. Each of the instructions is received by each of LA sub-layers that corresponds to one of the server apparatus. Each of the LA sub-layers selects a certain MAC control unit from among the plurality of MAC control units in the corresponding LA group in given orderm and sends the instruction to the selected MAC control unit. The MAC control unit instructs the corresponding MAC chip set to perform DMA (Direct Memort Access) to the data memory. The MAC chip set reads the PAUSE frame from the data memory, and transmits the PAUSE frame from the corresponding port to the link connected to it. Thus, the band control program 10 periodically provides an instruction for the transmission of a PAUSE frame to each of the server apparatus. Each of the server apparatus receives the PAUSE frame and performs PAUSE for the period of the PAUSE time a that is set in the PAUSE frame. The PAUSE time a set in the PAUSE frame that each of the server apparatus receives is a value calculated for the server apparatus, and therefore different from that of the other server apparatus. Thus each of the server apparatus performs PAUSE for a period of time that is different from those of the other server apparatus. However, the PAUSE time a of each of the server apparatus may coincide with that of another apparatus.

In the case of the band control program 33 as shown in FIG. 3, traffic observation time c is set by the network administrator. The traffic observation time c may be set for each of the server apparatus. The band control program 33 calculates permissible traffic p for each of the server apparatus based on the band use ratio $n_a$, $n_b$, $n_c$, or $n_d$ of the server apparatus. The LAN switch A 71 is provided with a byte counter. The byte counter measures the server transmission traffic of the frames transmitted from the server apparatus via the pluralities of links for each of the server apparatus. The byte counter measures the server transmission traffic of each of the links connected to each of the ports for each of the LA groups. The byte counter sums the server transmission traffic of the plurality of links for each of the LA groups. Thus, the byte counter measures the server transmission traffic of each of the server apparatus. The band control program 33 reads the server transmission traffic measured by the byte counter for each of the server apparatus each time the traffic observation time c has passed. The band control program 33 determines whether or not the server transmission traffic of any one of the server apparatus exceeds the permissible traffic p for the server apparatus. If the server transmission traffic of any one of the server apparatus exceeds the permissible traffic p for the server apparatus, the band control program 33 calculates PAUSE time e for the server apparatus. PAUSE time e is calculated based on the band use ratios $n_a$, $n_b$, $n_c$, and $n_d$ of the server apparatus and server transmission traffic, and therefore the values of PAUSE time e of the server apparatus differ from each other. However, the PAUSE time e of each of the server apparatus may coincide with that of another apparatus. The band control program 33 creates a PAUSE frame with a set value of PAUSE time e to store it in a data memory. The band control program 33 provides an instruction for the transmission of the PAUSE frame to the server apparatus. The instruction is received by an LA sub-layer which corresponds to the server apparatus. The LA sub-layer selects a certain MAC control unit from among the plurality of MAC control units in the corresponding LA group in given order, and sends the instruction to the selected MAC control unit. The MAC control unit instructs the MAC chip set to perform DMA (Direct Memory Access) to the data memory. The MAC chip set reads the PAUSE frame from the data memory according to the instruction. The MAC chip set transmits the PAUSE frame from the corresponding port to the link connected to it. Thus, if the server transmission traffic of any one of the server apparatus exceeds the permissible traffic p for the server apparatus, the band control program 33 provides an instruction for the transmission of a PAUSE frame to the server apparatus. The server apparatus that has received the PAUSE frame performs PAUSE for the period of the PAUSE time e that is set in the PAUSE frame.

In the network system described above, the network administrator may set a single band use ratio n as the total value of the band use ratios $n_a$, $n_b$, $n_c$, and $n_d$ of the server apparatus. In this case, the band control program 33 calculates permissible traffic p based on the band use ratio n. The byte counter measures and sums the server transmission traffic of the frames transmitted from each of the server apparatus via the plurality of links. Thus the byte counter measures the server transmission traffic of all of the server apparatus. The band control program 33 reads the server transmission traffic measured by the byte counter each time the traffic observation time c has passed. The band control program 33 determines whether or not the server transmission traffic exceeds the permissible traffic p. If the server transmission traffic exceeds the permissible traffic p, the band control program 33 calculates PAUSE time e. The band control program 33 creates a PAUSE frame with a set value of PAUSE time e to store it in the data memory. The band control program 33 provides an instruction for the transmission of the PAUSE frame to all of the server apparatus. The instruction is received by each of the LA sub-layers. Each of the LA sub-layers selects a certain MAC control unit from among the plurality of MAC control units in the corresponding LA group in given order, and sends the instruction to the selected MAC control unit. The MAC control unit instructs the MAC chip set to perform DMA (Direct Memory Access) to the data memory. The MAC chip set reads the PAUSE frame from the data memory according to the instruction. The MAC chip set transmits the PAUSE frame from the corresponding port to the link connected to it. Thus, if the server transmission traffic of all of the server apparatus exceeds the permissible traffic p, the band control program 33 provides an instruction for the transmission of a PAUSE frame to all of the server apparatus. Each of the server apparatus that has received the PAUSE frame performs PAUSE for the period of the PAUSE time e that is set in the PAUSE frame.

Thus, the server transmission traffic from the server apparatus group is controlled in such a way that each of the applications in each of the server apparatus provides a specified communication band volume.

In the second implementation method, the band control program 10 or 33 is implemented in parallel with the LA sub-layer 92. In this case, the band control program 10 or 33 corresponds to a MAC client 94 shown in FIG. 8. Each band control program 10 or 33 operates independently of the LA sub-layer 92. In the plurality of MAC control units in the network apparatus, a plurality of MAC control units each corresponding to one of a plurality of ports that are connected to one server apparatus comprise one LA group, as described above. Each of the band control programs 10 or 33 corresponds to one of the MAC control units 91 in one of the LA groups, and has direct access to the MAC control unit 91. Each of the MAC clients 94 instructs the corresponding MAC control unit 91 to transmit a PAUSE frame, and after receiving the instruction, the MAC control unit 91 performs processing according to the instruction.

Incidentally, the placement of MAC clients in this position is not specified in IEEE802.3 at present.

Figure 7:
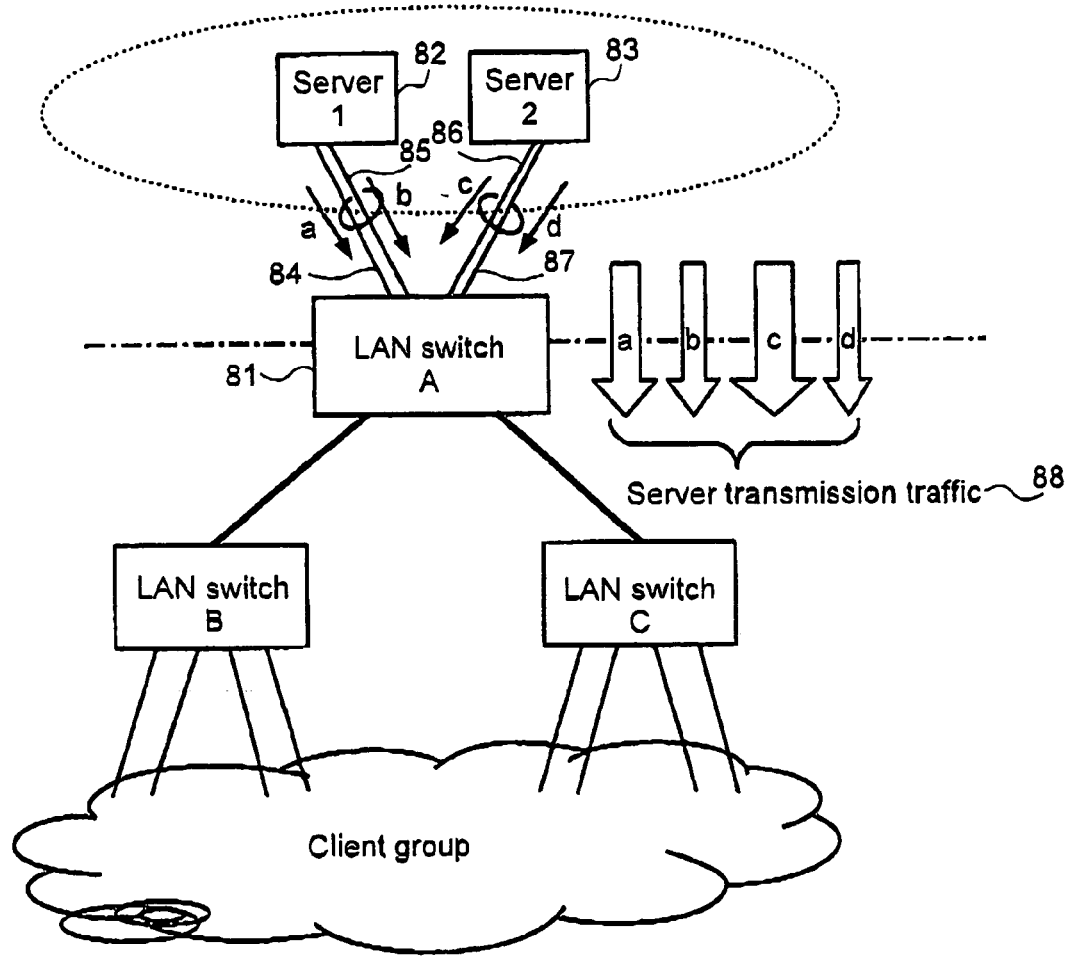
FIG. 7 is an example of a configuration of a network system in which communication band volume is controlled separately for each link.

FIG. 7 shows an example of the configuration of a network system in this case.

As in FIG. 6, server apparatus 82 and 83 are each connected to a LAN switch A 81 by a plurality of links. The network system shown in FIG. 7 differs from the network system shown in FIG. 6 in the following respects. In FIG. 7, each of the server apparatus 82 and 83 is provided with a plurality of applications. In addition, each of the plurality of links that connects one of the server apparatus to the LAN switch A 81 is provided for each of the applications. Specifically, the server apparatus 82 in FIG. 7 has two applications, and is connected to a link 84 and a link 85, each of which corresponds to one of the applications. Similarly, the server apparatus 83 has two applications, and is connected to a link 86 and a link 87, each of which corresponds to one of the applications. Each of the link 84 and the link 85 connects the server apparatus 82 to the LAN switch A 81, and transmits a frame as requested by the corresponding application. Each of the link 86 and the link 87 connects the server apparatus 83 to the LAN switch A 81, and transmits a frame as requested by the corresponding application.

The LAN switch A 81 has almost the same configuration as that of the LAN switch A 71 shown in FIG. 6. However, the LAN switch A 81 is provided with a plurality of band control programs 10 or 33 that each correspond to one MAC control unit. Each MAC control unit corresponds to a port that is connected to a link. Therefore, each of the band control programs 10 or 33 corresponds to a link for connecting to one of the server apparatus. Each link corresponds to one of the applications that one of the server apparatus has, and therefore each of the band control programs 10 or 33 corresponds to one of the applications.

The server transmission traffic generated on each of the links by one of the two applications of the server apparatus 82 is server transmission traffic a and server transmission traffic b, respectively. The server transmission traffic generated on each of the links by one of the two applications of the server apparatus 83 is server transmission traffic c and server transmission traffic d, respectively. The width of each of arrows a to d as shown in FIG. 7 represents server transmission traffic.

The network administrator of the network system sets a band use ratio $n_a$, $n_b$, $n_c$, or $n_d$ for each of the applications of the server apparatus. After setting the band use ratios $n_a$, $n_b$, $n_c$, and $n_d$, the network administrator starts the plurality of band control programs 10 or 33.

In the case of the band control program 10 shown in FIG. 1, the PAUSE transmission interval b is incorporated in advance in each of the band control programs 10. Since each of the band control programs 10 corresponds to one of the applications in one of the server apparatus, PAUSE time a for the corresponding application is calculated based on the band use ratio of the corresponding application. Each of the band control programs 10 creates a PAUSE frame for the corresponding application. The calculated PAUSE time a is set in each of the PAUSE frames. Each of the band control programs 10 stores each of the created PAUSE frames in a data memory, and sets the PAUSE transmission time a in a timer. When the time in the timer is up, each of the band control programs 10 provides instructions for the transmission of the PAUSE frames. The instructions are received by corresponding MAC control units. Each of the MAC control units instructs the corresponding MAC chip set to perform DMA (Direct Memory Access) to the data memory. Each MAC chip set reads the PAUSE frame, and transmits the PAUSE frame from the corresponding port to the link connected to it. Thus, each of the band control programs 10 periodically provides an instruction for the transmission of a PAUSE frame to each of the applications in each of the server apparatus. Each of the server apparatus receives the PAUSE frame and identifies the application that corresponds to the PAUSE frame. Each of the server apparatus stops transmission of a frame generated by the application for the period of the PAUSE time a that is set in the PAUSE frame. The PAUSE time a set in the PAUSE frame that each of the server apparatus receives is a value calculated for each of the applications, and therefore different from that of the other applications. Thus each of the server apparatus performs PAUSE for a period of time that differs from application to application. However, the PAUSE time a of each of the applications may coincide with that of another application.

In the case of the band control program 33 as shown in FIG. 3, traffic observation time c is set by the network administrator. The traffic observation time c may differ between the band control programs 33. Each of the band control programs 33 calculates permissible traffic p based on the band use ratio of the corresponding application. The LAN switch A 81 is provided with a byte counter. The byte counter measures the server transmission traffic of each of the links. Each of the band control programs 33 reads the server transmission traffic measured by the byte counter for each of the links each time the traffic observation time c has passed. Each of the band control programs 33 determines whether or not the measured server transmission traffic exceeds the permissible traffic p. If the measured server transmission traffic exceeds the permissible traffic p, each of the band control programs 33 calculates PAUSE time e for the corresponding application. PAUSE time e is calculated based on the band use ratio of the corresponding application and server transmission traffic, and therefore the values of PAUSE time e differ from application to application. However, the PAUSE time e of each of the applications may coincide with that of another application. Each of the band control programs 33 creates a PAUSE frame with a set value of PAUSE time e to store it in a data memory. Each of the band control programs 33 instructs the corresponding MAC control unit to transmit the PAUSE frame. Each MAC control unit instructs the corresponding MAC chip set to perform DMA (Direct Memory Access) to the data memory. Each MAC chip set reads the PAUSE frame from the data memory according to the instruction. Each MAC chip set transmits the PAUSE frame from the corresponding port to the link connected to it. Thus, if the server transmission traffic of any one of the applications in any one of the server apparatus exceeds the permissible traffic p, the band control programs 33 provide an instruction for the transmission of a PAUSE frame to the application. The server apparatus that has received the PAUSE frame stops transmission of a frame generated by the application for the period of the PAUSE time e that is set in the PAUSE frame.

Thus, the server transmission traffic from the server apparatus group is controlled in such a way that each of the applications in each of the server apparatus provides a specified communication band volume.

As described above, in the network systems shown in FIGS. 5, 6, and 7, the server transmission traffic is controlled in such a way that it does not exceed the band use ratio n set for each of the server apparatus by the network administrator.

The network administrator does not necessarily need to set a band use ratio n for each server apparatus or each application. Server transmission traffic may be controlled for each destination IP address, for example. If server transmission traffic is to be controlled for each destination IP address, all the server apparatus need to be provided with the same application. In this case, each of the server apparatus needs to allocate transmission frames to the links, whose bands are an object of control, based on the destination IP address.

Incidentally, in the present embodiments, the network apparatus is described as a LAN switch; however, the network apparatus may be a router. Even when the network apparatus is a router, the same effects as those of the LAN switch can be obtained.

As described above, the present embodiments prevent congestion in a network system that forms a server-client system. Server transmission traffic is controlled according to the unit (application, destination IP address, or the like) set by the network administrator.

What is claimed is:

1. A network apparatus arranged to be connected to at least one other apparatus via at least one transmission medium, comprising:
   a band controller for providing an instruction to transmit a control frame that temporarily suspends frame transmission from said at least one other apparatus; and
   a transmitter connected to said at least one transmission medium for transmitting said control frame to said at least one transmission medium according to the instruction from said band controller;
   wherein said network apparatus controls the transmission band volume of a frame transmitted from said at least one other apparatus to within a preset band volume; and
   wherein said band controller periodically instructs said transmitter to transmit said control frame.

2. A network apparatus as claimed in claim 1, further comprising;
   a timer for measuring a predetermined transmission interval;
   wherein said band controller provides an instruction for the transmission of said control frame each time said timer measures said predetermined transmission interval.

3. A network apparatus arranged to be connected to at least one other apparatus via at least one transmission medium, comprising:

a band controller for providing an instruction to transmit a control frame that temporarily suspends frame transmission from said at least one other apparatus; and a transmitter connected to said at least one transmission medium for transmitting said control frame to said at least one transmission medium according to the instruction from said band controller;

wherein said network apparatus controls the transmission band volume of a frame transmitted from said at least one other apparatus to within a preset band volume;

wherein said transmitter is provided to correspond to said at least one other apparatus, and includes at least one port connected to said at least one transmission medium;

wherein said transmitter transmits said control frame from said at least one port; and wherein said band controller periodically instructs said transmitter to transmit said control frame.

4. A network apparatus arranged to be connected to at least one other apparatus via at least one transmission medium, comprising:

a band controller for providing an instruction to transmit a control frame that temporarily suspends frame transmission from said at least one other apparatus; and a transmitter connected to said at least one transmission medium for transmitting said control frame to said at least one transmission medium according to the instruction from said band controller;

wherein said network apparatus controls the transmission band volume of a frame transmitted from said at least one other apparatus to within a preset band volume;

wherein said transmitter is provided to correspond to said at least one other apparatus, and includes at least one port connected to said at least one transmission medium;

wherein said transmitter transmits said control frame from said at least one port;

wherein said preset band volume is set to correspond to the total of the frame transmission band volume transmitted from said at least one other apparatus; and wherein said band controller instructs said transmitter to transmit said control frame when the total of the frame transmission band volume transmitted from said at least one other apparatus exceeds said preset band volume.

5. A network apparatus arranged to be connected to at least one other apparatus via at least one transmission medium, comprising:

a band controller for providing an instruction to transmit a control frame that temporarily suspends frame transmission from said at least one other apparatus; and a transmitter connected to said at least one transmission medium for transmitting said control frame to said at least one transmission medium according to the instruction from said band controller;

wherein said network apparatus controls the transmission band volume of a frame transmitted from said at least one other apparatus to within a preset band volume;

wherein said transmitter is provided to correspond to said at least one other apparatus, and includes at least one port connected to said at least one transmission medium;

wherein said transmitter transmits said control frame from said at least one port;

wherein said preset band volume is set to correspond to each of some of said at least one other apparatus; and wherein said band controller instructs said transmitter to transmit said control frame to the port provided to correspond to said at least one other apparatus when the transmission band volume of a frame transmitted from said at least one other apparatus exceeds the band volume preset for said at least one other apparatus.

6. A network apparatus arranged to be connected to at least one other apparatus via at least one transmission medium, comprising;

a band controller for providing an instruction to transmit a control frame that temporarily suspends frame transmission from said at least one other apparatus; and a transmitter connected to said at least one transmission medium for transmitting said control frame to said at least one transmission medium according to the instruction from said band controller;

wherein said network apparatus controls the transmission band volume of a frame transmitted from said at least one other apparatus to within a preset band volume;

wherein said transmitter is provided to correspond to said at least one other apparatus, and includes at least one port connected to said at least one transmission medium;

wherein said transmitter transmits said control frame from said at least one port; and wherein said network apparatus includes at least one said band controller that corresponds to each of some of said at least one port.

7. A network apparatus arranged to be connected to at least one other apparatus via at least one transmission medium, comprising:

a band controller for providing an instruction to transmit a control frame that temporarily suspends frame transmission from said at least one other apparatus; and a transmitter connected to said at least one transmission medium for transmitting said control frame to said at least one transmission medium according to the instruction from said band controller;

wherein said network apparatus controls the transmission band volume of a frame transmitted from said at least one other apparatus to within a preset band volume;

wherein said transmitter is provided to correspond to said at least one other apparatus, and includes at least one port connected to said at least one transmission medium;

wherein said transmitter transmits said control frame from said at least one port; and wherein said network apparatus includes only one unit of said band controller.

8. A network apparatus as claimed in claim 2, wherein said band controller includes a plurality of registers, and said plurality of registers each retain said preset band volume, a period for which said at least one other apparatus is made to suspend frame transmission, and said predetermined transmission interval.

9. A network apparatus arranged to be connected to at least one other apparatus via at least one transmission medium, comprising;

a band controller for providing an instruction to transmit a control frame that temporarily suspends frame transmission from said at least one other apparatus;

a transmitter connected to said at least one transmission medium for transmitting said control frame to said at least one transmission medium according to the instruction from said band controller; and a measuring unit for measuring the transmission band volume of a frame transmitted from said at least one other apparatus;

wherein said network apparatus controls the transmission band volume of a frame transmitted from said at least one other apparatus to within a preset band volume;

wherein said band controller instructs said transmitter to transmit said control frame when the transmission band volume of a frame transmitted from said at least one other apparatus exceeds said preset band volume; and wherein said band controller further comprises:

a plurality of registers each retaining said preset band volume, a suspension period for which said at least one other apparatus is made to suspend frame transmission, and a traffic observation interval for periodically reading the transmission band volume measured by the measuring unit; and a timer for measuring said traffic observation interval;

wherein said band controller reads the transmission band volume measured by said measuring unit each time said timer measures said traffic observation time, and if said band controller determines that the read transmission band volume exceeds said preset band volume, said band controller calculates said suspension period and instructs said transmitter to transmit said control frame including said calculated suspension period.

10. A network apparatus arranged to be connected to a plurality of apparatus via a plurality of transmission media, comprising;

a plurality of ports each connected to one of said plurality of transmission media, each of said plurality of apparatus being connected to one or more ports of said plurality of ports via one or more transmission media;

a band controller for providing an instruction to transmit a control frame that temporarily suspends frame transmission by each of said plurality of apparatus; and a transmitter for transmitting said control frame from each of said plurality of ports to each of said plurality of transmission media, according to the instruction from said band controller;

wherein said network apparatus controls the transmission band volume of a frame transmitted from each of said plurality of apparatus to within a preset band volume; and wherein said band controller periodically instructs said transmitter to transmit said control frame to at least one apparatus of said plurality of apparatus.

11. A network apparatus arranged to be connected to a plurality of apparatus via a plurality of transmission media, comprising;

a plurality of ports each connected to one of said plurality of transmission media, each of said plurality of apparatus being connected to one or more ports of said plurality of ports via one or more transmission media;

a band controller for providing an instruction to transmit a control frame that temporarily suspends frame transmission by each of said plurality of apparatus; and a transmitter for transmitting said control frame from each of said plurality of ports to each of said plurality of transmission media, according to the instruction from said band controller;

wherein said network apparatus controls the transmission band volume of a frame transmitted from each of said plurality of apparatus to within a preset band volume;

wherein said preset band volume is set to correspond to the total of the frame transmission band volume transmitted from said plurality of apparatus; and wherein said band controller instructs said transmitter to transmit said control frame if the total of said frame transmission band volume exceeds said preset band volume.

12. A network apparatus arranged to be connected to a plurality of apparatus via a plurality of transmission media, comprising;

a plurality of ports each connected to one of said plurality of transmission media, each of said plurality of apparatus being connected to one or more ports of said plurality of ports via one or more transmission media;

a band controller for providing an instruction to transmit a control frame that temporarily suspends frame transmission by each of said plurality of apparatus; and a transmitter for transmitting said control frame from each of said plurality of ports to each of said plurality of transmission media, according to the instruction from said band controller;

wherein said network apparatus controls the transmission band volume of a frame transmitted from each of said plurality of apparatus to within a preset band volume;

wherein said preset band volume is set for each of said plurality of transmission media in such a way as to correspond to the transmission band volume of a frame transmitted via each of said plurality of transmission media; and wherein if the transmission band volume of a frame transmitted via any one of said plurality of transmission media exceeds said preset band volume that corresponds to said any one transmission medium, said band controller instructs said transmitter to transmit said control frame from a port connected to said any one transmission medium.

13. A network apparatus connected to a plurality of apparatus via a plurality of transmission media, comprising:

a plurality of ports each connected to one of said plurality of transmission media, each of said plurality of apparatus being connected to one or more ports of said plurality of ports via one or more transmission media;

a band controller for providing an instruction to transmit a control frame that temporarily suspends frame transmission by each of said plurality of apparatus; and a transmitter for transmitting said control frame from each of said plurality of ports to each of said plurality of transmission media, according to the instruction from said band controller;

wherein said network apparatus controls the transmission band volume of a frame transmitted from each of said plurality of apparatus to within a preset band volume;

wherein said transmitter includes at least one link aggregation sub-layer and a plurality of MAC control units;

wherein said at least one link aggregation sub-layer receives an instruction from said band controller and distributes said instruction to each of said plurality of MAC control units; and wherein each of said plurality of MAC control units corresponds to each of said plurality of ports, and transmits said control frame from each of said plurality of ports according to the instruction from said band controller.

14. A network apparatus as claimed in claim 13, wherein said band controller consists of a plurality of band controllers, and each of said plurality of band controllers corresponds to each of said plurality of MAC control units and periodically instructs one MAC control unit of said plurality of MAC control units that corresponds to itself to transmit said control frame.

15. A network apparatus as claimed in claim 13, further comprising:
- a byte counter for summing the frame transmission band volume transmitted via said plurality of transmission media;
- wherein only one said band controller is provided for said plurality of MAC control units, and provides an instruction for the transmission of said control frame when the total of said transmission band volume exceeds said preset band volume.

16. A method of communication between at least one first apparatus and at least one second apparatus connected to said at least one first apparatus via at least one transmission medium, comprising the steps of:
- transmitting a frame from said at least one first apparatus;
- receiving said transmitted frame by means of said at least one second apparatus;
- transmitting a control frame that instructs to temporarily suspend frame transmission to be performed by said at least one first apparatus using said at least one second apparatus;
- receiving said control frame at said at least one first apparatus; and
- temporarily suspending frame transmission at said at least one first apparatus in response to said received control frame;
- wherein the step of transmitting said control frame includes the step of preparing a control frame with a set suspension period for which said at least one first apparatus is made to suspend frame transmission;
- wherein at said suspending step, frame transmission is suspended for said suspension period that is set in said control frame;
- wherein frame transmission by said at least one first apparatus is resumed after said suspension period has passed;
- wherein at the step of transmitting said control frame, said control frame is periodically transmitted by said at least one second apparatus; and
- wherein at said suspending step, frame transmission is periodically suspended according to said control frame that is periodically received.

17. A method of communication between at least one first apparatus and at least one second apparatus connected to said at least one first apparatus via at least one transmission medium, comprising the steps of:
- transmitting a frame from said at least one first apparatus;
- receiving said transmitted frame by means of said at least one second apparatus;
- transmitting a control frame that instructs to temporarily suspend frame transmission to be performed by said at least one first apparatus using said at least one second apparatus;
- receiving said control frame at said at least one first apparatus; and
- temporarily suspending frame transmission at said at least one first apparatus in response to said received control frame;
- wherein the step of transmitting said control frame includes the step of preparing a control frame with a set suspension period for which said at least one first apparatus is made to suspend frame transmission;
- wherein at said suspending step, frame transmission is suspended for said suspension period that is set in said control frame;
- wherein frame transmission by said at least one first apparatus is resumed after said suspension period has passed;
- wherein said method further comprises the step of setting a band volume allowable to be used by a frame transmitted from said at least one first apparatus within a range of the communication band volume possessed by said at least one transmission medium; and
- wherein at the step of transmitting said control frame, said control frame is transmitted when the transmission band volume of a frame transmitted from said at least one first apparatus exceeds said set band volume.

18. A method of communication as claimed in claim 17, wherein the step of transmitting said control frame further includes the steps of;
- measuring the transmission band volume of a frame transmitted from said at least one first apparatus;
- calculating a suspension period when said measured transmission band volume exceeds said set band volume; and
- wherein at the step of preparing said control frame, said calculated suspension period is set in said control frame.

19. A method of communication as claimed in claim 18, wherein at the step of measuring said transmission band volume, transmission band volume per predetermined period is measured.

20. A network apparatus as claimed in claim 13,
- wherein said preset band volume is set for each of said plurality of apparatus in such a way as to correspond to the transmission band volume of a frame transmitted from each of said plurality of apparatus; and
- wherein if the transmission band volume of a frame transmitted from any one apparatus of said plurality of apparatus exceeds said preset band volume that corresponds to said any one apparatus, said band controller instructs said transmitter to transmit said control frame to said any one apparatus.

* * * * *